(12) United States Patent
Okubo et al.

(10) Patent No.: US 7,251,993 B1
(45) Date of Patent: Aug. 7, 2007

(54) TIRE INFORMATION COMMUNICATION SYSTEM

(75) Inventors: Youichi Okubo, Ogaki (JP); Shinichi Kawase, Ogaki (JP); Yasuhisa Tsujita, Ogaki (JP); Syuji Aoyama, Kani (JP)

(73) Assignee: Pacific Industrial Co., Ltd., Ogaki-shi (JP)

( * ) Notice: Subject to any disclaimer, the term of this patent is extended or adjusted under 35 U.S.C. 154(b) by 0 days.

(21) Appl. No.: 11/448,067

(22) Filed: Jun. 7, 2006

(30) Foreign Application Priority Data

Dec. 27, 2005 (JP) .............................. 2005-374294

(51) Int. Cl.
*B60C 23/02* (2006.01)
(52) U.S. Cl. .................. 73/146.4; 73/146; 340/442
(58) Field of Classification Search ....... 73/146–146.8; 340/442–447
See application file for complete search history.

(56) References Cited

U.S. PATENT DOCUMENTS

| | | | | |
|---|---|---|---|---|
| 3,895,347 | A * | 7/1975 | Takusagawa et al. | 340/447 |
| 4,837,553 | A * | 6/1989 | Pompier | 340/442 |
| 5,029,468 | A * | 7/1991 | Dosjoub | 73/146.5 |
| 5,095,744 | A * | 3/1992 | Macecek et al. | 73/146 |
| 5,731,516 | A * | 3/1998 | Handfield et al. | 73/146.5 |
| 7,010,968 | B2 * | 3/2006 | Stewart et al. | 73/146 |
| 7,202,778 | B2 * | 4/2007 | Buenz et al. | 340/448 |

FOREIGN PATENT DOCUMENTS

| | | |
|---|---|---|
| JP | A 05-169931 | 7/1993 |
| JP | A 10-166820 | 6/1998 |
| JP | A 2003-273785 | 9/2003 |
| JP | A 2005-119370 | 5/2005 |

* cited by examiner

*Primary Examiner*—Edward Lefkowitz
*Assistant Examiner*—Jermaine Jenkins
(74) *Attorney, Agent, or Firm*—Oliff & Berridge, PLC

(57) ABSTRACT

A tire information communication system mounted on a vehicle includes a tire-pressure detector mounted on a tire wheel for detecting a pressure of a tire and transmitting a result of detection, a tire monitor mounted on a vehicle body for obtaining information about tire pressure from the tire-pressure detector, a tire transmission circuit provided in the tire-pressure detector for applying AC voltage containing information about tire pressure between the tire wheel and an annular conductor of the tire so that a radio wave is radiated from the annular conductor, a vehicle ground isolation provided in the tire monitor so as to receive the radio wave from the annular conductor thereby to be capable of generating AC voltage between the vehicle ground and itself, and a body-side receiving circuit provided in the tire monitor and connected to the vehicle ground and the vehicle ground isolation respectively for obtaining the information about the tire pressure from the AC voltage generated between the vehicle ground and the vehicle ground isolation.

27 Claims, 19 Drawing Sheets

TIRE INFORMATION COMMUNICATION SYSTEM

BACKGROUND OF THE INVENTION

1. Field of the Invention

The present invention relates to a tire information communication system comprising a tire-pressure detector mounted on a tire wheel for detecting tire pressure and transmitting a result of detection and a tire monitor provided in a vehicle body for obtaining the result of detection of tire pressure.

2. Description of the Related Art

Conventional tire information communication systems of the above-mentioned type comprise a tire-pressure detector and a tire monitor. Radio communication is carried out between the tire-pressure detecting device and the tire monitor so that a result of detection of tire pressure by the tire-pressure detector is transmitted to the tire monitor. JP-A-2005-119370 discloses one of the above-described tire information communication systems. The tire-pressure detector includes a loop antenna for radio communication and is fixed on a tire wheel. The tire monitor also includes a loop antenna and is disposed inside a dashboard of the vehicle body.

However, the above-described conventional system is susceptible to a null point where the communication sensitivity thereof is extremely lowered due to difference in a rotational position of a tire. As a result, communication performed by the system becomes unstable. Furthermore, the communication sensitivity is generally low other than the null point. Power consumption is increased in order to compensate for the low communication sensitivity.

SUMMARY OF THE INVENTION

Therefore, an object of the present invention is to provide a tire information communication system which is capable of performing a better communication between a tire and a vehicle body.

The present invention provides a tire information communication system provided in a vehicle on which a tire wheel with a tire having an annular conductor provided over a whole periphery thereof is mounted and which the tire wheel is electrically conductive via an axle of a vehicle body to a vehicle ground. The system comprises a tire-pressure detector mounted on the tire wheel for detecting a pressure of the tire, thereby transmitting a result of detection, a tire monitor mounted on the vehicle body for obtaining the information about tire pressure from the tire-pressure detector, a tire-side transmission circuit provided in the tire-pressure detector for applying AC voltage containing information about tire pressure between the tire wheel and the annular conductor so that a radio wave is radiated from the annular conductor, a vehicle ground isolation provided in the tire monitor so as to receive the radio wave from the annular conductor thereby to be capable of generating AC voltage between the vehicle ground and the vehicle ground isolation, and a body-side receiving circuit provided in the tire monitor and connected to the vehicle ground and the vehicle ground isolation respectively for obtaining the information about the tire pressure from the AC voltage generated between the vehicle ground and the vehicle ground isolation.

The tire-side transmission circuit applies AC voltage containing information about tire pressure between the tire wheel and the annular conductor provided on the tire. As a result, a potential of the annular conductor changes over the whole periphery of the tire, whereupon the radio waves are radiated in a predetermined direction from the tire irrespective of a rotational position of the tire. The radiated radio waves cause AC voltage to be generated between the vehicle ground and the vehicle ground isolation of the vehicle body. The body-side receiving circuit then obtains information about tire pressure from the AC voltage. Consequently, since the radio waves are radiated from the tire in the predetermined direction irrespective of the rotational position of the tire, communication can be rendered more stable. Furthermore, the tire-pressure detector is grounded through the tire wheel and axle to the vehicle ground. The tire monitor is also grounded to the vehicle ground. Consequently, the communication sensibility between the tire-pressure detector and the tire monitor can be improved and accordingly, the power consumption can be reduced. Thus, a better communication can be carried out between the tires and the vehicle body in the above-described system as compared with the conventional systems.

The annular conductor may include a metal net embedded in the tire. The metal net can be used both for reinforcement of the tire and for communication.

In a preferred form, the vehicle is an automobile which is provided with a car radio system or car navigation system and includes a rod antenna or rear-glass antenna for receiving electric waves for the car radio system or the car navigation system. In this case, the vehicle ground isolation includes the rod antenna or rear-glass antenna. Thus, when the rod antenna or rear-glass antenna is used as the vehicle ground isolation as well as for receiving electric waves for the car radio system or the car navigation system, cost reduction can be achieved as compared with the case where discrete components are provided for vehicle ground isolation. In the same way, the vehicle preferably includes a chassis serving as the vehicle ground and a door defining a space with the chassis therebetween is used as a vehicle ground isolation. Consequently, cost reduction can also be achieved.

BRIEF DESCRIPTION OF THE DRAWINGS

Other objects, features and advantages of the present invention will become clear upon reviewing the following description of the preferred embodiment with reference to the accompanying drawings, in which.

DETAILED DESCRIPTION OF THE INVENTION

Figure 1:
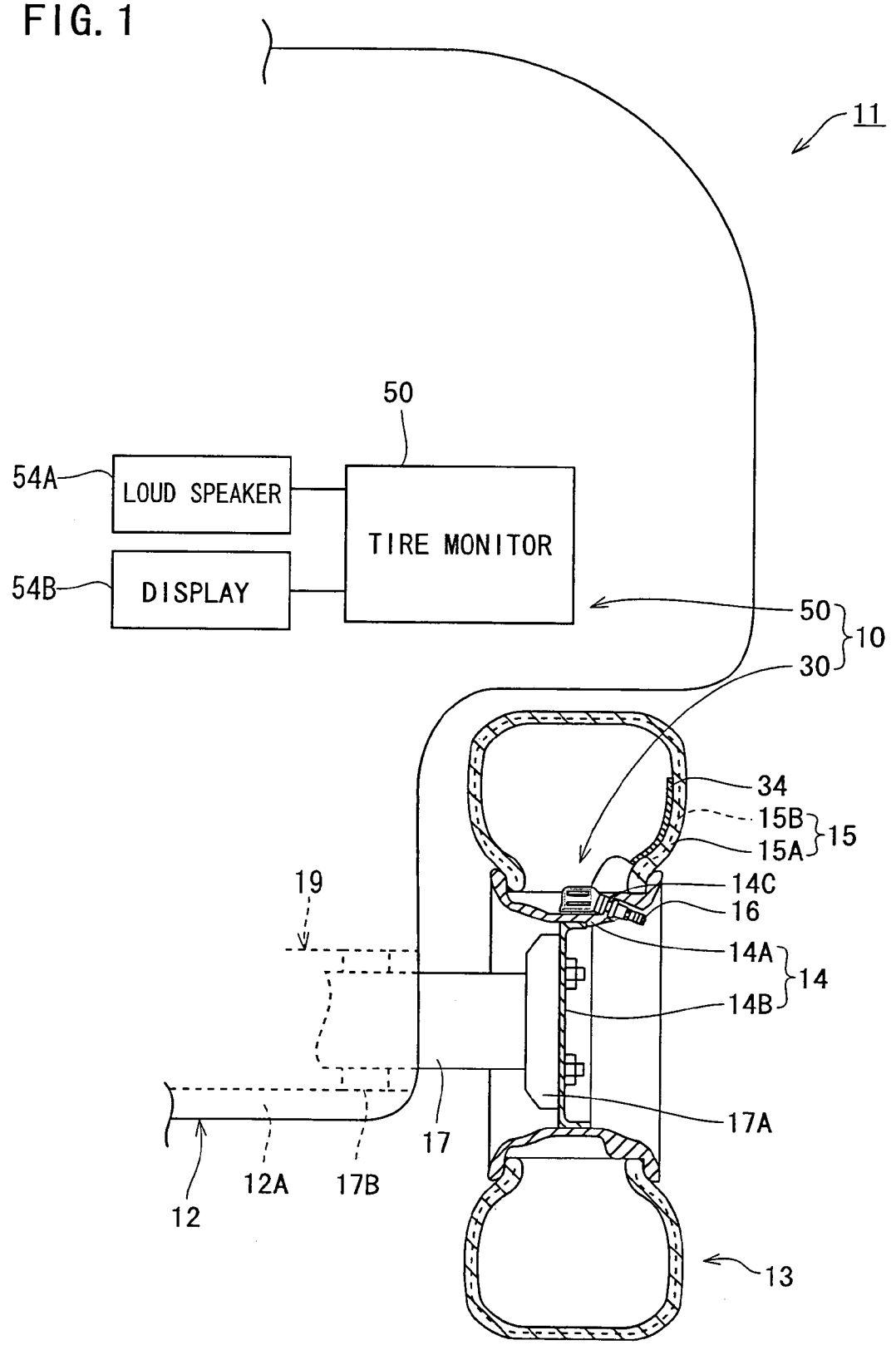
FIG. 1 is a conceptual diagram of a tire information communication system in accordance with a first embodiment of the present invention.

A first embodiment of the present invention will be described with reference to FIGS. 1 to 7. Referring to FIG. 1, a tire information communication system 10 of the embodiment comprises four tire-pressure detectors 30 provided on four wheels 13 (only one wheel being shown) respectively and a single tire monitor 50 provided on a vehicle body 12. Each wheel 13 includes a tire 15 fitted with a rim 14A of a tire wheel 14. Each tire 15 employs a tubeless tire. A metal net 15B for reinforcement is embedded in rubber 15A composing each tire 15. The metal net 15B is formed over a whole periphery of each tire 15 and is electrically conductive in whole.

Figure 2:
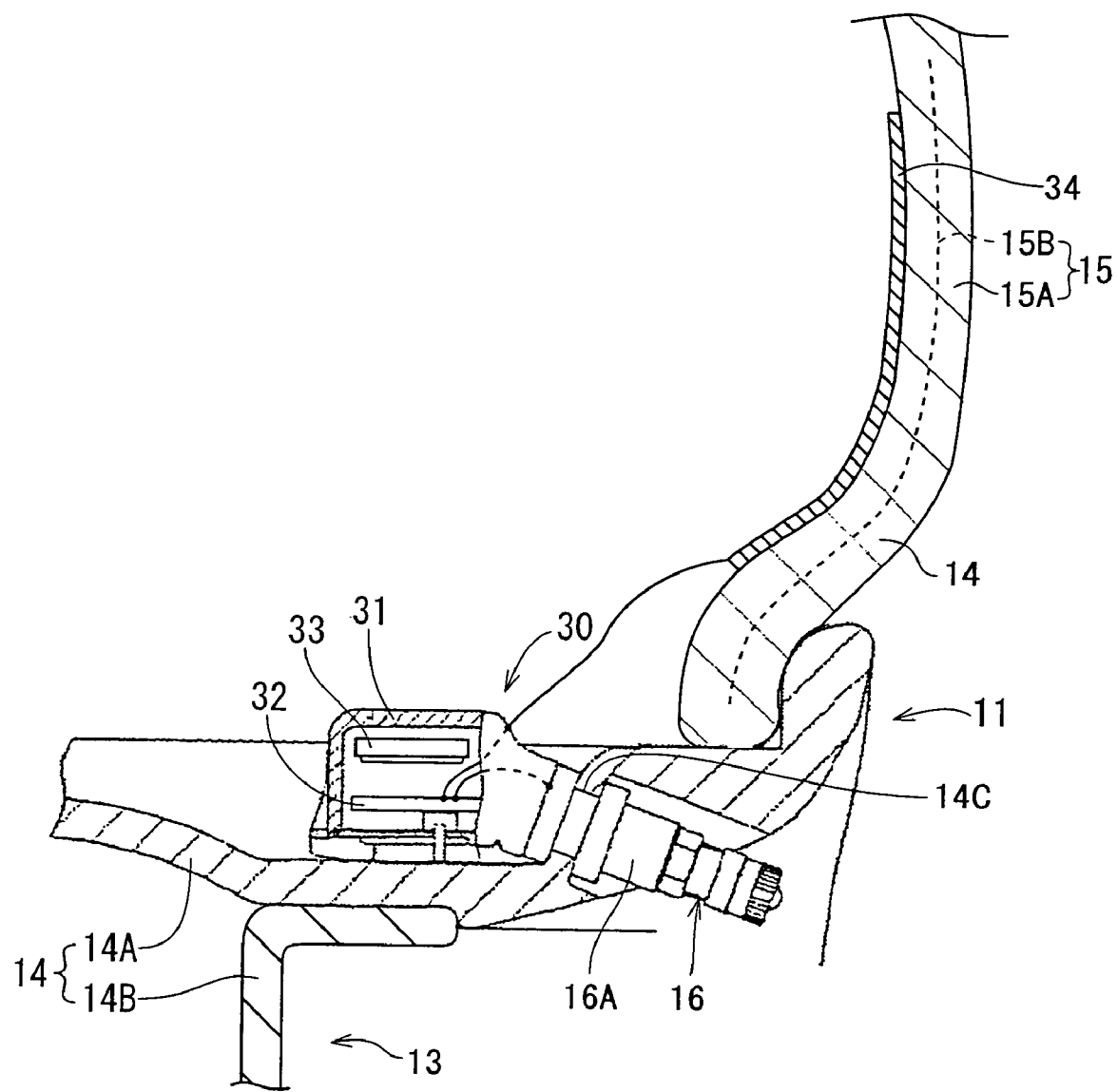
FIG. 2 is a sectional view of a tire, tire wheel and tire-pressure detector.

Referring to FIG. 2, the rim 14A is formed with a valve attachment hole 14C in which a tire valve 16 is fixed. The tire valve 16 includes a cylindrical valve stem 16A which has both open ends and encloses a valve core (not shown) with a check valve structure. The tire valve 16 has a distal end and a proximal end and is disposed in the tire 15 so that the distal end thereof protrudes to the inner peripheral side of the rim 14A and the proximal end thereof protrudes to the outer peripheral side of the rim 14A.

A tire-pressure detector 30 provided in each wheel 13 is fixed on the proximal end of the tire valve 16 and disposed in the tire 15. The tire-pressure detector 30 includes a case 31 fixed on the tire valve 16 and enclosing a circuit board 32 and a microcell 33 therein.

Figure 3:
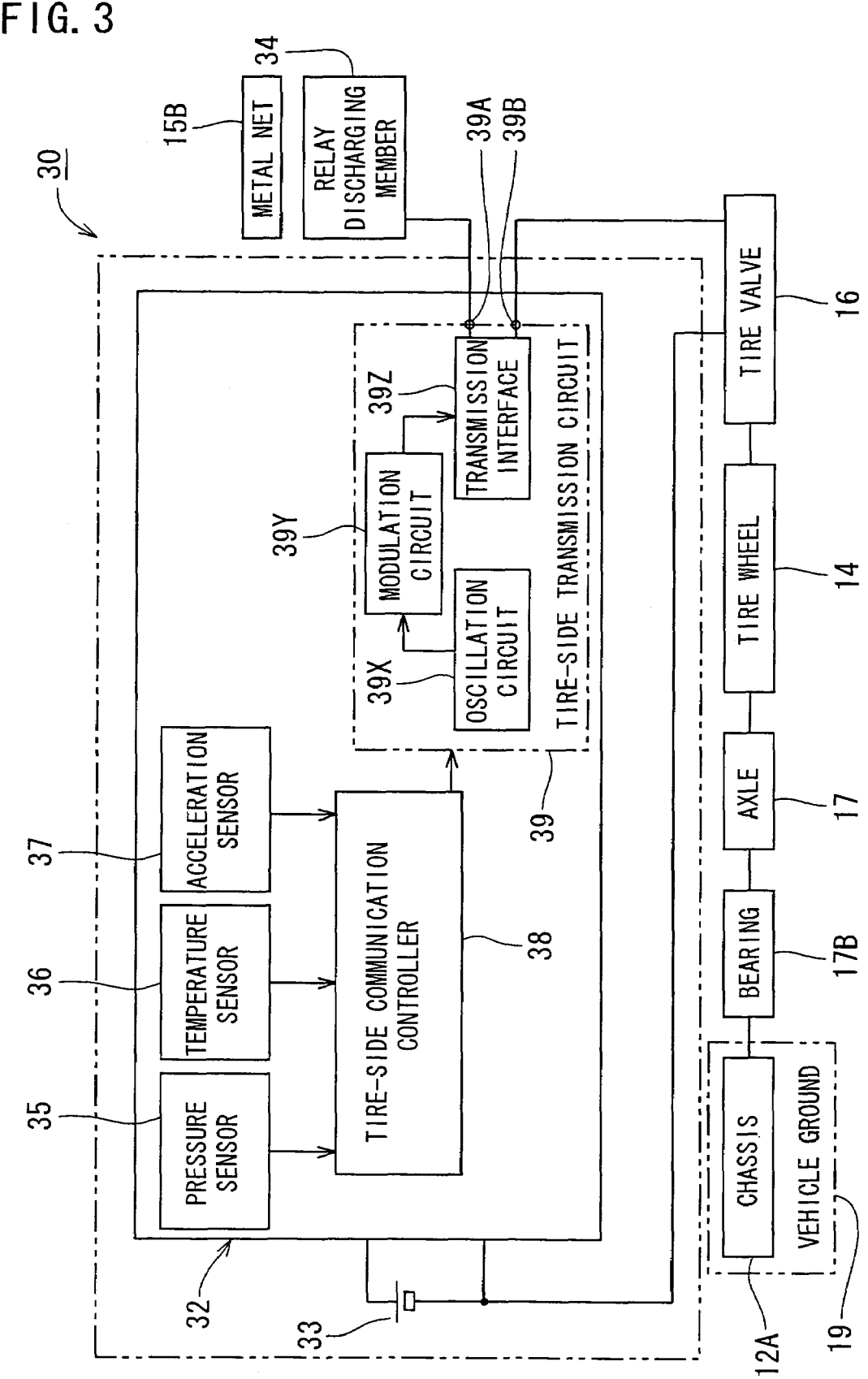
FIG. 3 is a circuit diagram showing the tire-pressure detector.

Referring to FIG. 3, a pressure sensor 35, a temperature sensor 36 and an acceleration sensor 37 are mounted on the circuit board 32. A tire-side communication controller 38 and a tire-side transmission circuit 39 in the present invention are also mounted on the circuit board 32. The tire-side communication controller 38 carries out a predetermined program to take in results of detection by the pressure and temperature sensors 35 and 36 on condition that the acceleration sensor 37 has detected centrifugal force resulting from rotation of the wheel 13. The tire-side communication controller 38 then delivers information of identification data set for every tire-pressure detector 30 of the four wheels 13 to the tire-side transmission circuit 39 together with information about the results of detection of tire pressure and temperature, for example. In the tire-side transmission circuit 39, a modulation circuit 39Y performs frequency modulation of carrier waves produced by an oscillation circuit 39X, thereby generating AC voltage containing the aforesaid information about the tire pressure and the like. The AC voltage is applied between the tire wheel 14 and the metal net 15 through a transmission interface 39Z. For that, one of paired output terminals 39A and 39B provided on the tire-side transmission circuit 39 or the output terminal 39A is connected to a relay discharge sheet 34 serving as a relay discharging member in the invention. The other output terminal 39B is connected to the tire valve 16 (or more specifically, to the valve stem 16A of the tire valve 16).

Consequently, the output terminal 39B is conductively connected via the tire valve 16 to the tire wheel 14. Furthermore, the relay discharge sheet 34 is made by coating a sheet-like conductive member with an insulating film. The relay discharge sheet 34 is affixed to an inner surface of the tire 15 so as to be opposed to a part of the metal net 15B. Thus, the relay discharge sheet 34 and the part of the metal net 15B constitute a capacitor, whereupon the output terminal 39A and the metal net 15B are energizable in a non-contact manner.

The vehicle body 12 includes a chassis 12A and a group of conductors conductive to the chassis. The chassis 12A and the conductor group can be used as a ground of electrical circuits. In the embodiment, the chassis 12A and a whole conductor group including an engine and a metal bumper both conductive to the chassis 12A constitute a vehicle ground 19 in the invention. The tire wheel 14 is conductive to the vehicle ground 19. More specifically, the tire wheel 14 includes a disc 14B located inside the rim 14A. The disc 14B is fixed on a hub disc 17A located at a distal end of the axle 17 extending from the vehicle body 12. The axle 17 is conductive to the vehicle ground 19 including the chassis 12A via a bearing 17B and the like.

Figure 5:
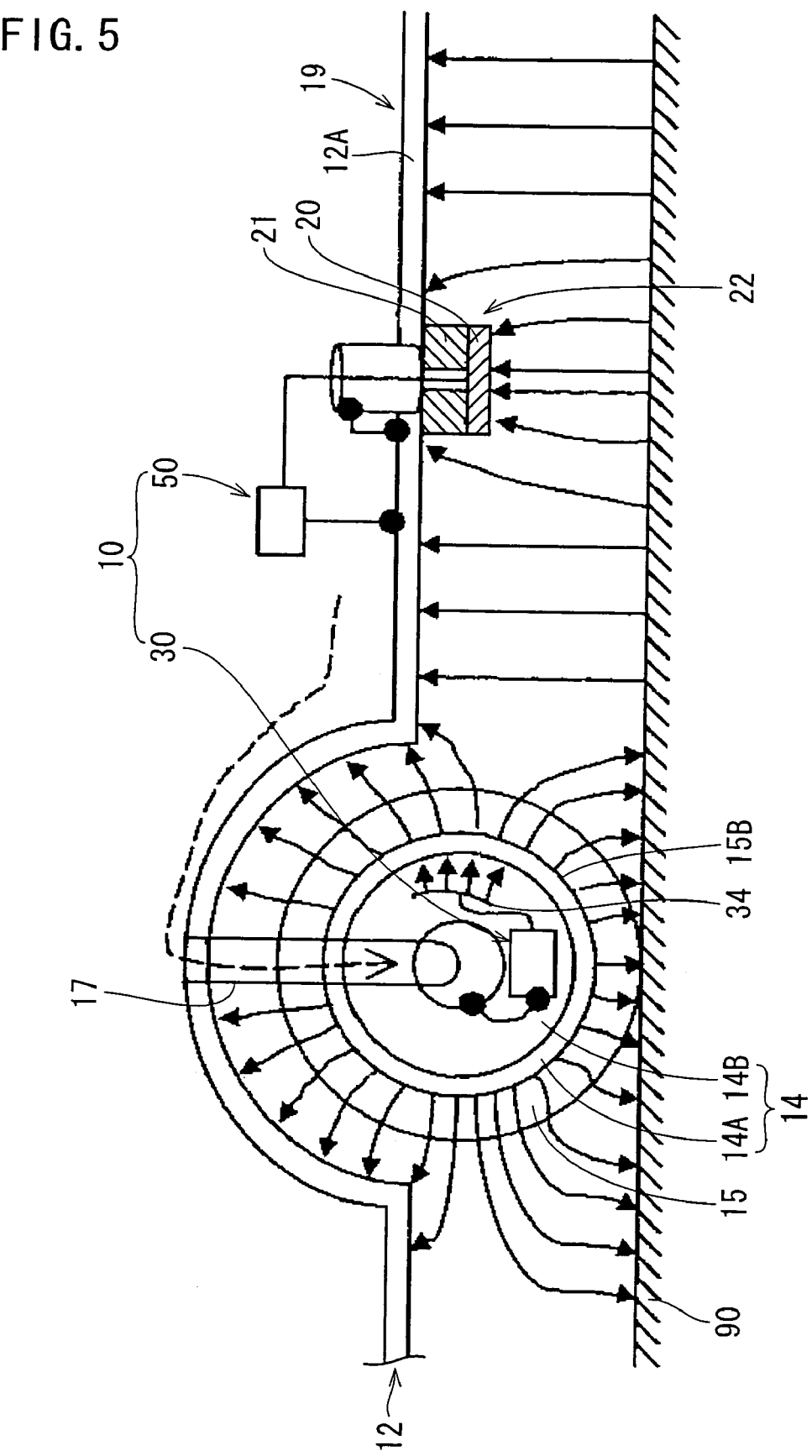
FIG. 5 is a schematic diagram of electric field around the vehicle.

In the tire-side transmission circuit 39, AC voltage is applied between the tire wheel 14 and the metal net 15B so that radio waves are radiated from the metal net 15B. Field waves contained in the radio waves generate an electric filed between the metal net 15B and the vehicle body 12 or between the metal net 15B, the ground 90, and the vehicle body 12. FIG. 5 shows an example of the electric field by way of electric lines of force. The arrows indicative of electric lines of force in FIG. 5 are inverted according to a phase of waves of electric field, namely, a phase of AC voltage.

Figure 4A:
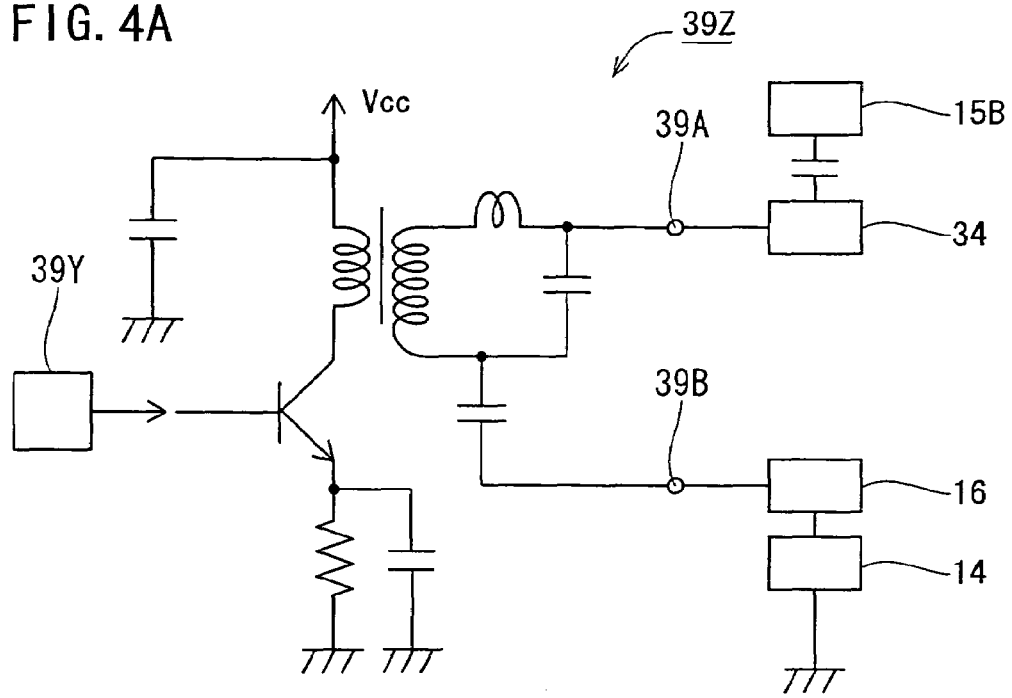
FIG. 4 is a circuit diagram showing a transmission interface.
Figure 4B:
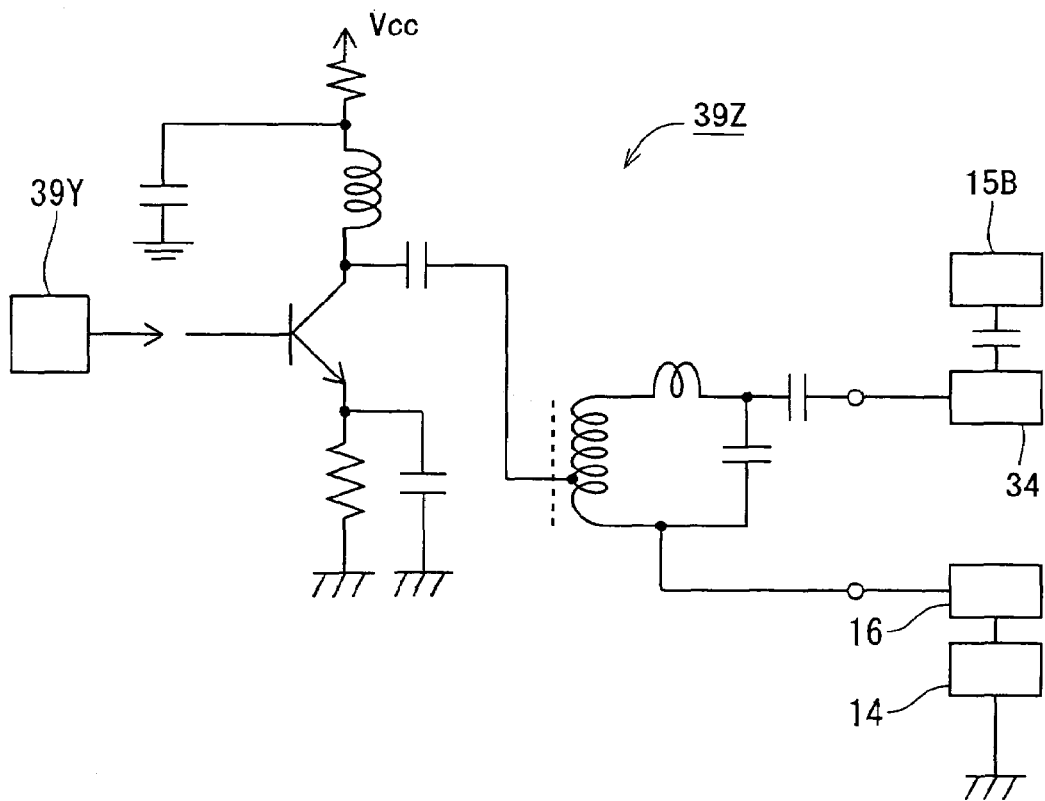

In order to improve an intensity of electric field produced from the metal net 15B as described above, it is preferable to increase a potential difference between the relay discharge sheet 34 and the vehicle ground 19. On the other hand, since the tire-pressure detector 30 draws power from the microcell 33, reducing power consumption is desired also from the point of battery life. For this purpose, transformer coupling is made between the modulation circuit 39Y and the relay discharge sheet 34 in the transmission interface 39Z as shown in FIG. 4A, so that the metal net 15 side has a higher impedance than the modulation circuit 39Y side. Furthermore, a secondary side of transformer coupling is set at a predetermined impedance so that impedance is matched in a frequency range from 40 to 100 MHz. Alternatively, the same effect can be achieved when the core transmission interface 39Z is configured into an electric circuit as shown in FIG. 4B, instead of the above transformer coupling.

A plate 20 is provided on the underside of the chassis 12A as shown in FIG. 5. The plate 20 serves as a vehicle ground isolation in the invention. The plate 20 is positioned on the underside of the chassis 12A so as to be substantially equidistant from the four wheels 13, for example. The plate 20 is fixed to the chassis 12A with a dielectric 21 being interposed therebetween. The plate 20, dielectric 21 and a part of the chassis 12A constitute a patch antenna 22. The dielectric 21 is made from polytetrafluoroethylene (Teflon®), for example and has a relative dielectric constant of 2.2.

Figure 6:
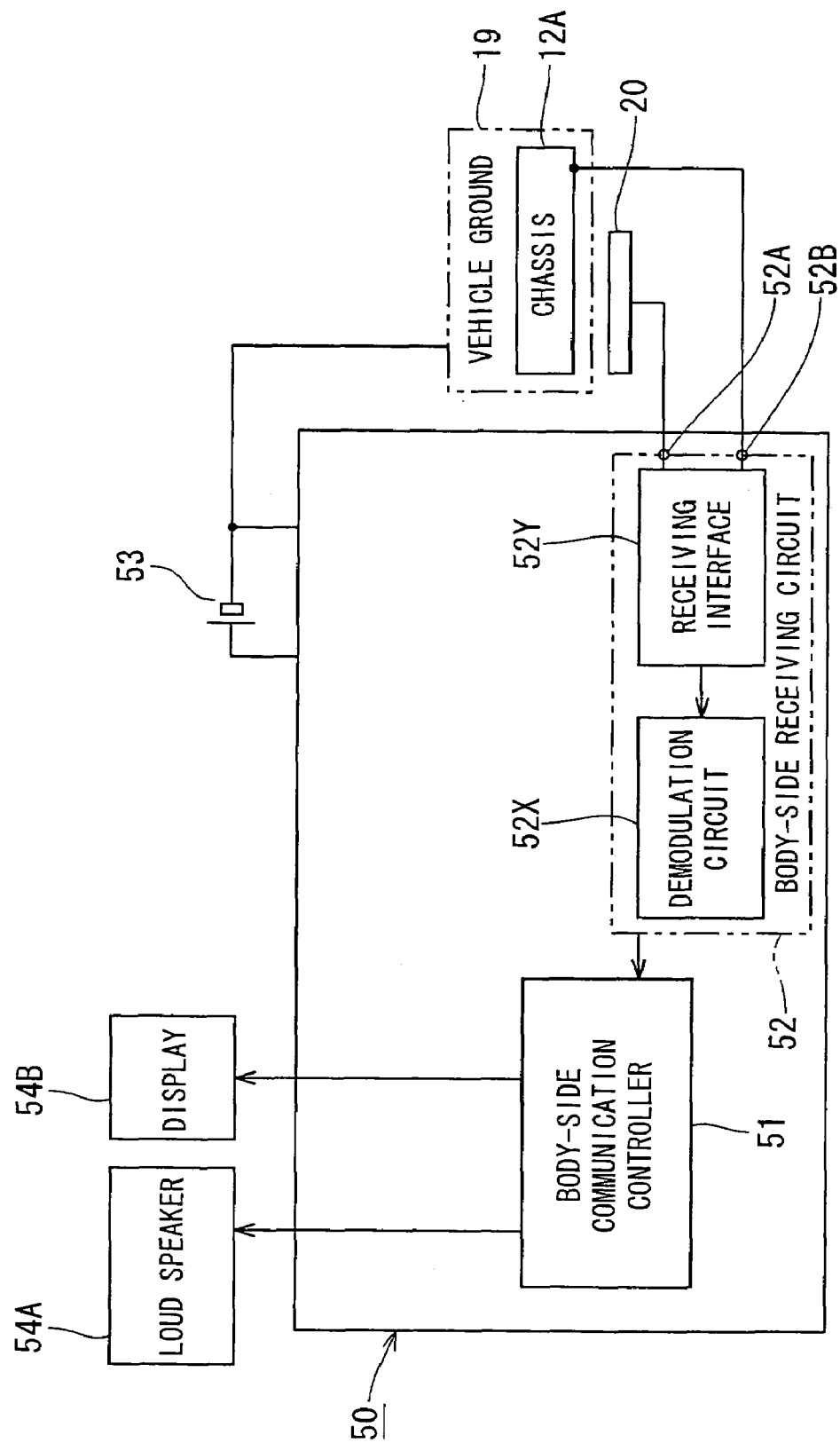
FIG. 6 is a circuit diagram showing a tire monitor.
Figure 7A:
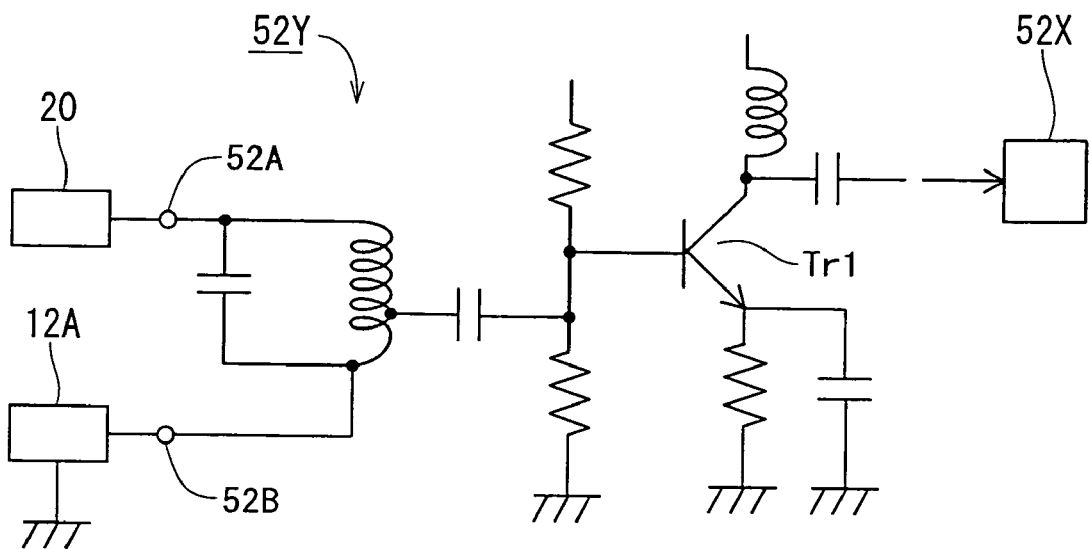
FIG. 7 is a circuit diagram showing a receiving interface.
Figure 7B:
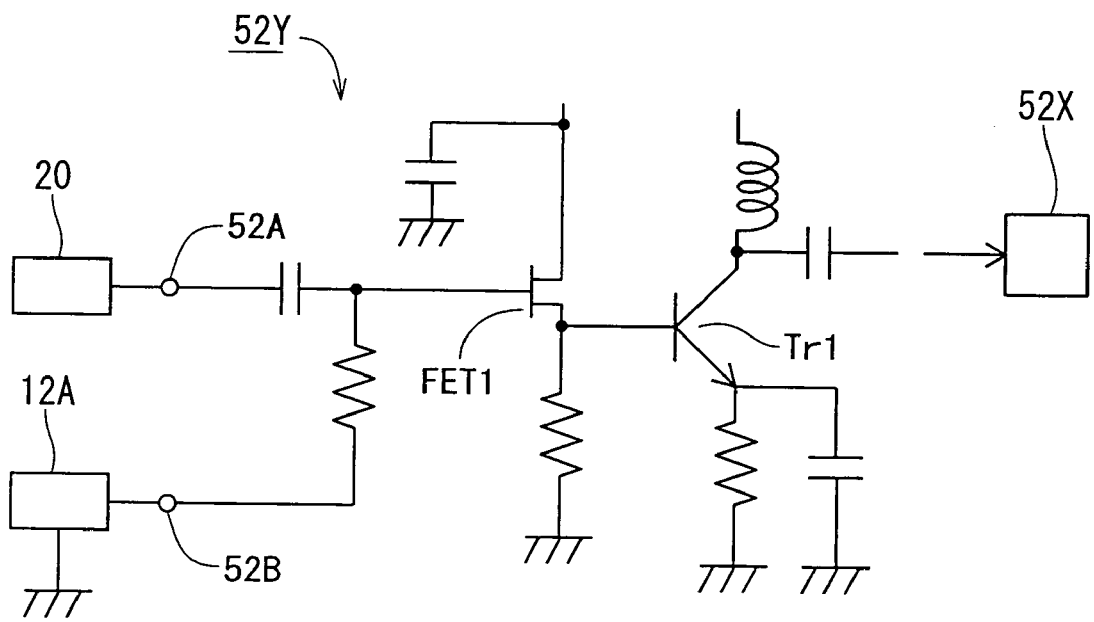

The tire monitor 50 is disposed inside the chassis 12A and includes a body-side communication controller 51 and a body-side receiving circuit 52 as shown in FIG. 6. The body-side receiving circuit 52 includes a receiving interface 52Y having a pair of input terminals 52A and 52B to which the plate 20 and chassis 12A are connected respectively. When the body-side receiving circuit 52 receives electric waves from the metal net 15B, AC voltage is produced between the chassis 12A and the plate 20. The AC voltage is supplied through the receiving interface 52Y to a demodulating circuit 52X where the AC voltage is demodulated so that information contained in the electric waves is extracted. FIG. 7A illustrates an arrangement of the receiving interface 52Y of the body-side receiving circuit 52. In the receiving interface 52Y, the potential difference between the plate 20 and the chassis 12A is amplified by using a transistor Tr1. Alternatively, the same effect can be achieved by another circuit arrangement of the receiving interface 52Y as shown in FIG. 7B.

The tire information communication system of the embodiment operates as follows. When the vehicle 11 is driven, centrifugal force is applied to the tire-pressure detectors 30 of the four wheels 13. In each tire-pressure detector 30, the acceleration sensor 37 detects centrifugal force. Each tire-pressure detector 30 transmits results of detection of tire pressure and temperature together with identification data. Accordingly, AC voltage whose frequency has been modulated according to the information about tire pressure and the like is applied between the tire wheel 14 and the relay discharge sheet 34.

Then, an electric field is produced between the relay discharge sheet 34 and the metal net 15B of the tire 15, so that current flows between the relay discharge sheet 34 and the metal net 15B. As a result, the potential of the metal net 15B changes over the whole circumference of the tire 15, whereupon electric waves are radiated in a predetermined direction from the tire 15 irrespective of the rotational position of the tire. The electric waves produce an electric field between the metal net 15B, the ground 90 and the plate 20 as shown in FIG. 5. Furthermore, the electric waves also produce an electric field between the vehicle ground 19 and the plate 20. The body-side receiving circuit 52 of the tire monitor 50 takes in AC voltage produced between the vehicle ground 19 and the plate 20 in the vehicle body 12 to obtain information about the tire pressure and the like.

Based on the identification data contained in the obtained information, the body-side communication controller 51 of the tire monitor 50 identifies one of the tire-pressure detectors 30 and determines abnormality of tire pressure and tire temperature. When determining that the tire pressure and/or temperature is abnormal, the communication controller 51 causes a loud speaker 54A (see FIG. 6) provided on the vehicle body 12 to produce a warning sound or causes a display 54B (see FIG. 6) provided on the vehicle body 12 to display the location of the abnormal tire 15 together with warning message.

According to the foregoing embodiment, the electric wave for communication is radiated in a predetermined direction from the tire 15 irrespective of the rotational position of the tire. Consequently, occurrence of a null point in the communication can be reduced and accordingly, the communication can be rendered more stable. Furthermore, since the tire-pressure detector 30 and the tire monitor 50 are grounded to a common vehicle ground 19, the communication sensibility can be improved and accordingly, power consumption can be reduced. This was proved by experiments which will be described later. Still furthermore, since the metal net 15B embedded in the tire 15 for reinforcement is used for communication, effective use of resources can be realized. Moreover, when the relay discharge sheet 34 conductively connected to the tire-side transmission circuit 39 is applied to the inner surface of the tire 15, the metal net 15B can be energized in a non-contact manner. Consequently, the metal net 15B of an existing tire 15 can easily be used for communication.

Figure 8:
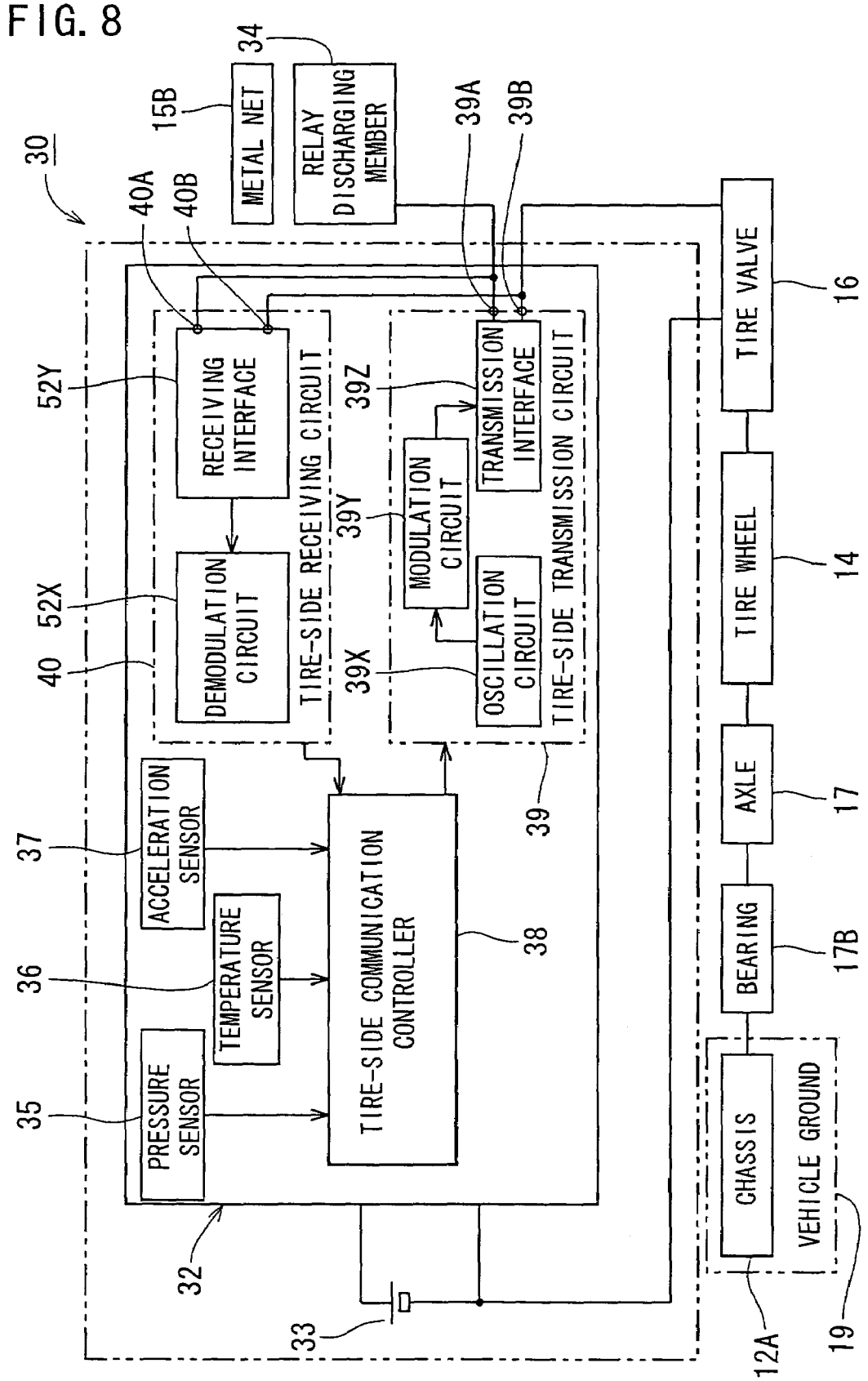
FIG. 8 is a circuit diagram showing the tire-pressure detector employed in the tire information communication system in accordance with a second embodiment of the invention.
Figure 9:
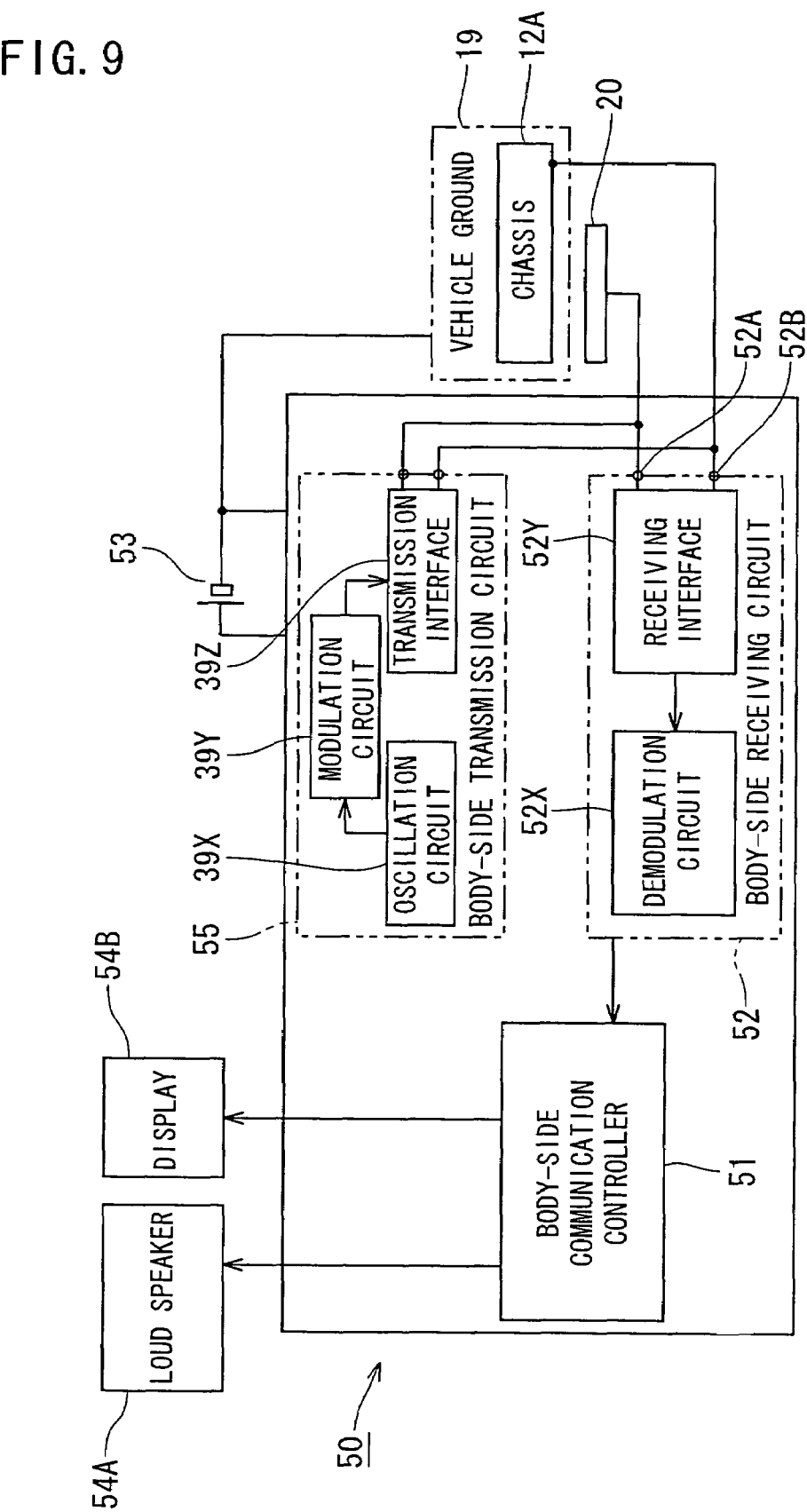
FIG. 9 is a circuit diagram showing the tire monitor.

FIGS. 8 and 9 illustrate a second embodiment of the invention. The second embodiment differs from the first embodiment in the addition of a tire-side receiving circuit 40 to the tire-pressure detector 30 as shown in FIG. 8 and in the addition of a tire-side transmission circuit 55 to the tire monitor 50 as shown in FIG. 9.

The tire-side receiving circuit 40 has the same arrangement as the body-side receiving circuit 52 employed in the first embodiment. The tire-side transmission circuit 39 and the tire-side receiving circuit 40 are connected in parallel to each other between the relay discharge sheet 34 and the tire valve 16.

On the other hand, the body-side transmission circuit 55 has the same arrangement as the tire-side transmission circuit 39 employed in the first embodiment. The body-side receiving circuit 52 and the body-side transmission circuit 55 are connected in parallel to each other between the chassis 12A and the plate 20. The other arrangement in the second embodiment is the same as that in the first embodiment and accordingly, description of the arrangement will be omitted. According to the second embodiment, bidirectional communication can be carried out between each tire-pressure detector 30 and the tire monitor 50.

Figure 10:
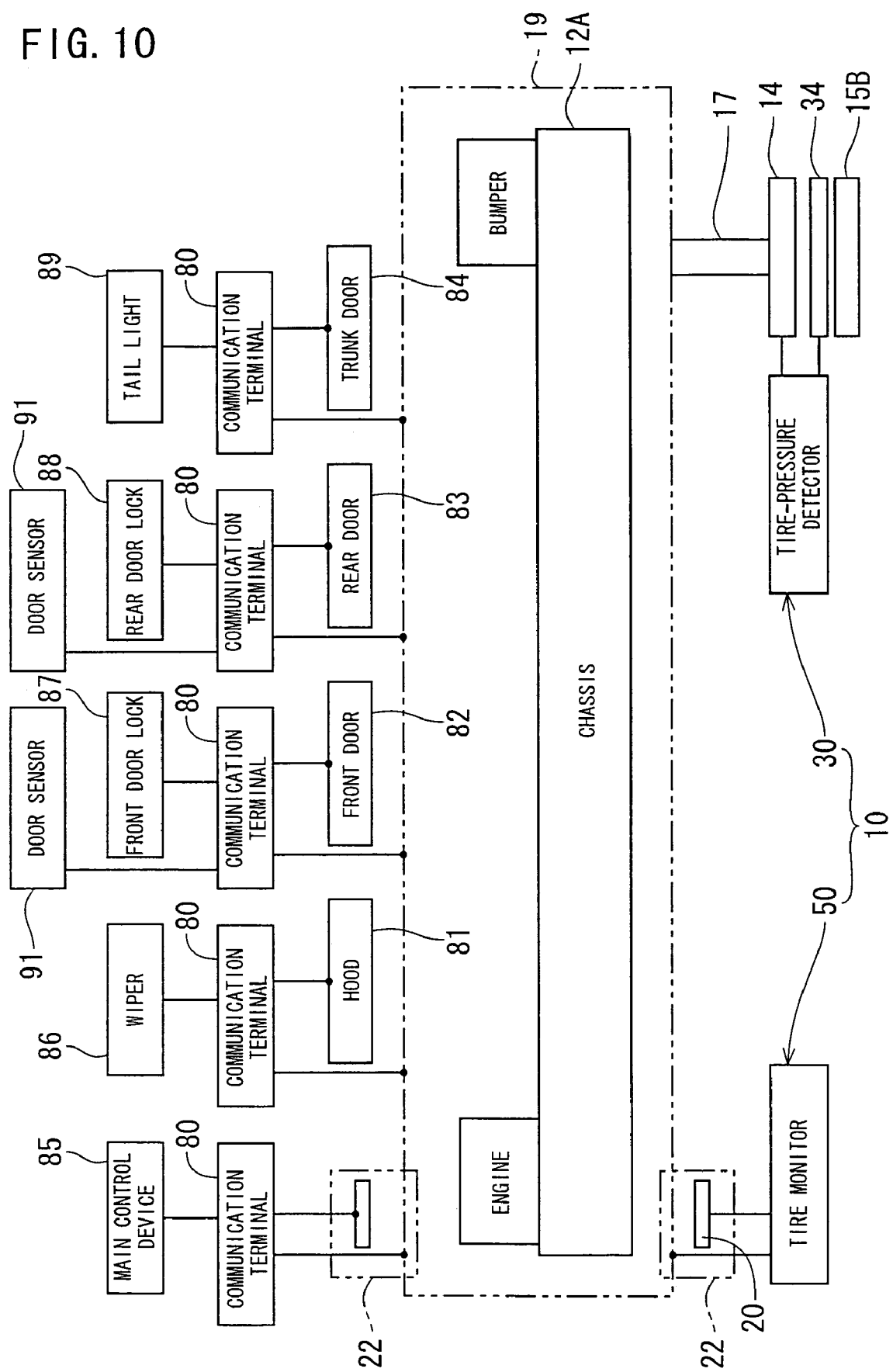
FIG. 10 is a conceptual diagram showing an electrical arrangement of the tire information communication system in accordance with a third embodiment of the invention.
Figure 11:
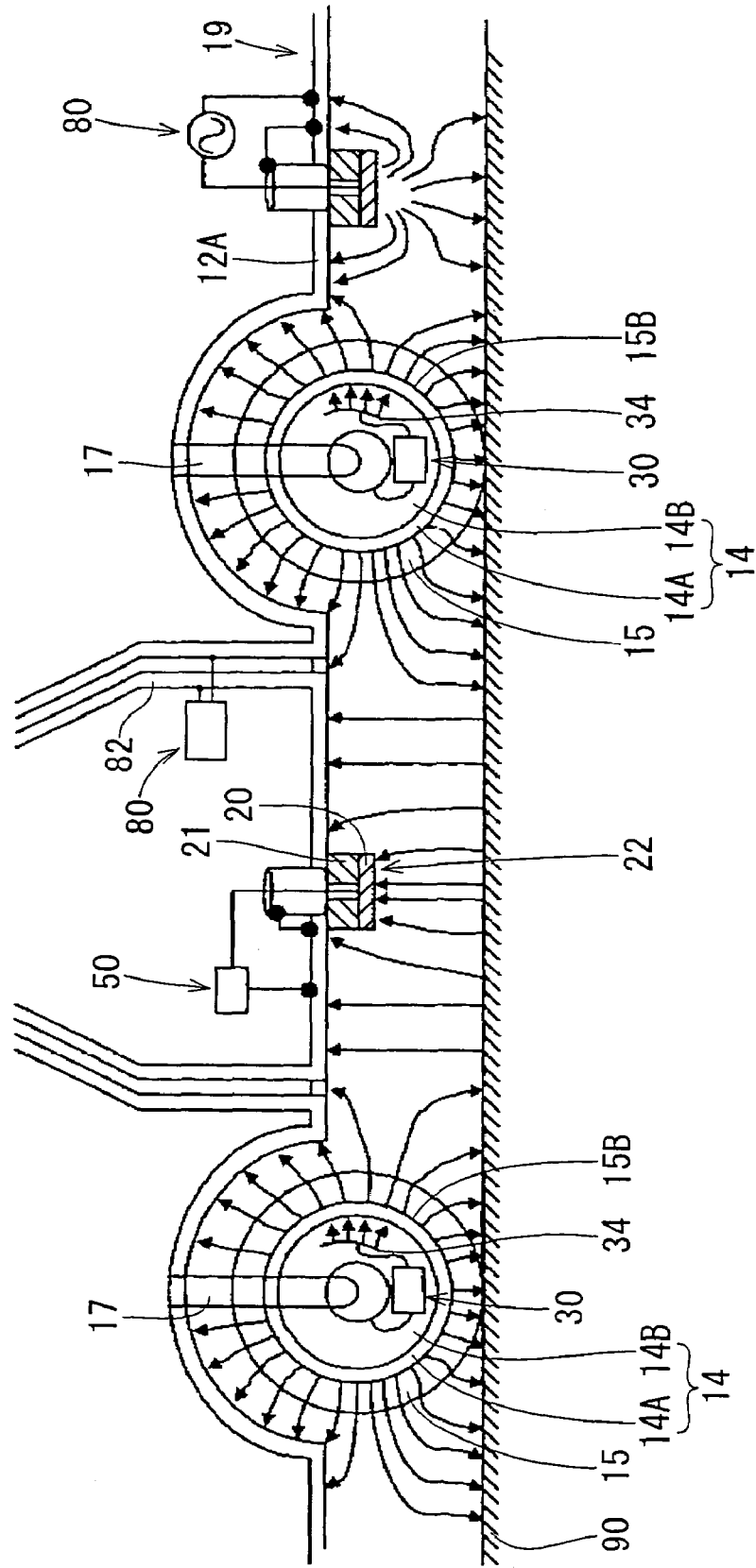
FIG. 11 is a schematic diagram of electric field around the vehicle.

FIGS. 10 and 11 illustrate a third embodiment of the invention. In the third embodiment, the vehicle 11 is provided with a plurality of communication terminals 80 in addition to the tire information communication system 10 as shown in FIG. 10. The communication terminals 80 are connected to driven members such as a wiper 86, a front-door lock 87, a rear-door lock 88, a tail light 89 and the like, passive members such as a door sensor 91 for detecting a half-shut state of a door and a main control device 85 respectively.

The communication terminal 80 for the main control device 85 is connected to another patch antenna 22 which is discrete from that of the tire monitor 50. The communication terminal 80 for the wiper 86 is connected to a hood 81 and the vehicle ground 19. Furthermore, the front-door lock 87 and the door sensor 91 are connected to a common communication terminal 80. This communication terminal 80 is connected to a front door 82 and the vehicle ground 19. In the same way, the rear-door lock 88 and the door sensor 91 are connected to a common communication terminal 80. This communication terminal 80 is connected to a rear door 83 and the vehicle ground 19. Still further, the communication terminal 80 for the tail light 89 is connected to a trunk door 84 and the vehicle ground 19.

Each communication terminal 80 includes the body-side receiving circuit 52 and the body-side transmission circuit 55 as described in the second embodiment. Each communication terminal 80 produces an electric field around the vehicle body 12 to transmit and receive information to and from another communication terminal 80 as shown in FIG. 11. More specifically, when a wiper operation switch (not shown) provided on the vehicle body 12 is operated, the main control device 85 (see FIG. 10) applies AC voltage containing wiper driving command to the patch antenna 22. As a result, an electric field is produced around the vehicle body 12, and each communication terminal 80 obtains information from the main control device 85 based on AC voltage produced between the vehicle ground 19 and each of the door members (81 to 84). The communication terminal 80 for the wiper 86 then drives the wiper 86, whereas the other communication terminals 80 each ignore obtained information. In the same way, when the door sensor 91 of the front door 82 has detected a half-shut door, the communication terminal 80 connected to the door sensor 91 applies AC voltage containing information about half-shut door between the vehicle ground 19 and the front door 82. Then, the main control device 85 obtains the AC voltage and turns on a warning light located at the driver's seat in the same way as described above.

According to the third embodiment, the chassis 12A and door members 81-84 constituting the vehicle body 12 constitute an in-vehicle LAN. Although AC voltage produced between the door members 81-84 and the vehicle ground 19 is used for communication in the foregoing embodiment, AC voltage produced between a rod antenna 94 or rear-glass antenna 95 (see FIG. 15A) for receiving electric waves for car radio system or car navigation system and the vehicle ground 19 may be used for communication.

EXAMPLE 1

Example 1 having the same arrangement as the system 10 of the first embodiment was produced. Prior product 1 of a tire information communication system with a loop antenna was also produced. Experiments 1 to 4 were conducted regarding example 1 and prior product 1.

Figure 15A:
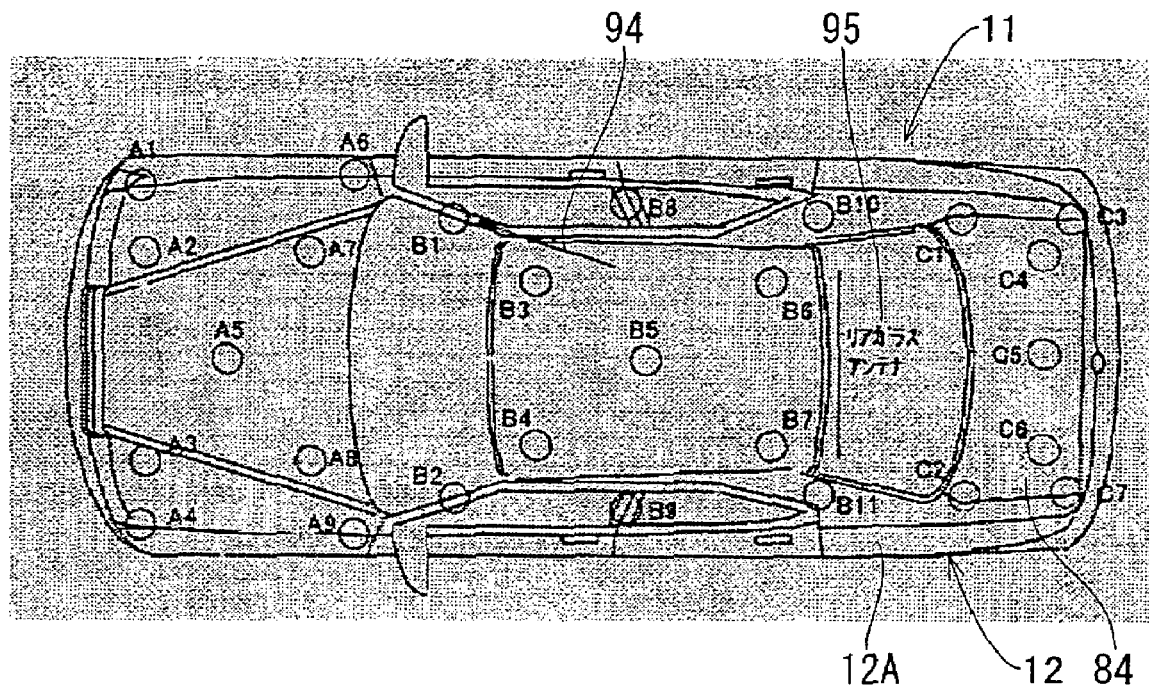
FIGS. 15A and 15B are a plan view and a side view of a vehicle employed in the experiments.
Figure 15B:
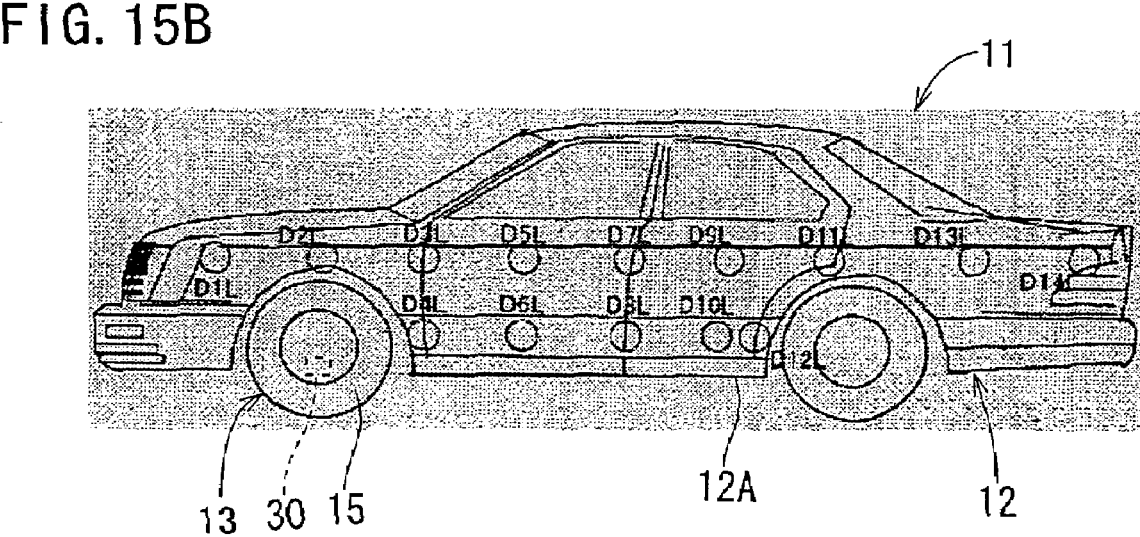

FIG. 15 shows an appearance of the vehicle 11 employed in the experiments. The shown vehicle 11 had a minimum space of about 200 mm between the vehicle body 12 and the ground. Each tire 15 mounted on the vehicle 11 was an ordinary tire embedded with a reinforcing metal net 15B. The relay discharge sheet 34 employed in example 1 was 100×100 mm square and was affixed to the inner surface of the tire 15.

Method of Experiment 1:

The tire-pressure detector 30 of example 1 was mounted on the left front wheel 13 of the vehicle 11. The patch antenna 22 for the tire monitor 50 was disposed on the underside of the chassis 12A. Signals were transmitted from the tire-pressure detector 30 to the tire monitor 50. In this case, electric power P1 the detector 30 consumed for transmission was measured, whereas electric power P2 supplied via the patch antenna 22 to the monitor 50 was measured. A propagation rate R was obtained from electric powers P1 and P2 and the following equation (1):

$$R = 10 \cdot \text{Log}(P2/P1) dB \quad (1)$$

In this case, the tire-pressure detector 30 applied AC voltage between the tire wheel 14 and the relay discharge sheet 34. The frequency of the applied voltage, namely, the frequency of carrier wave was gradually increased from 100 kHz to 500 MHz, whereupon changes of the propagation rate R relative to the frequency of the carrier waves were graphed. Furthermore, the prior product 1 was mounted on the vehicle 11 instead of example 1, and the same measurement was carried out.

Figure 12A:
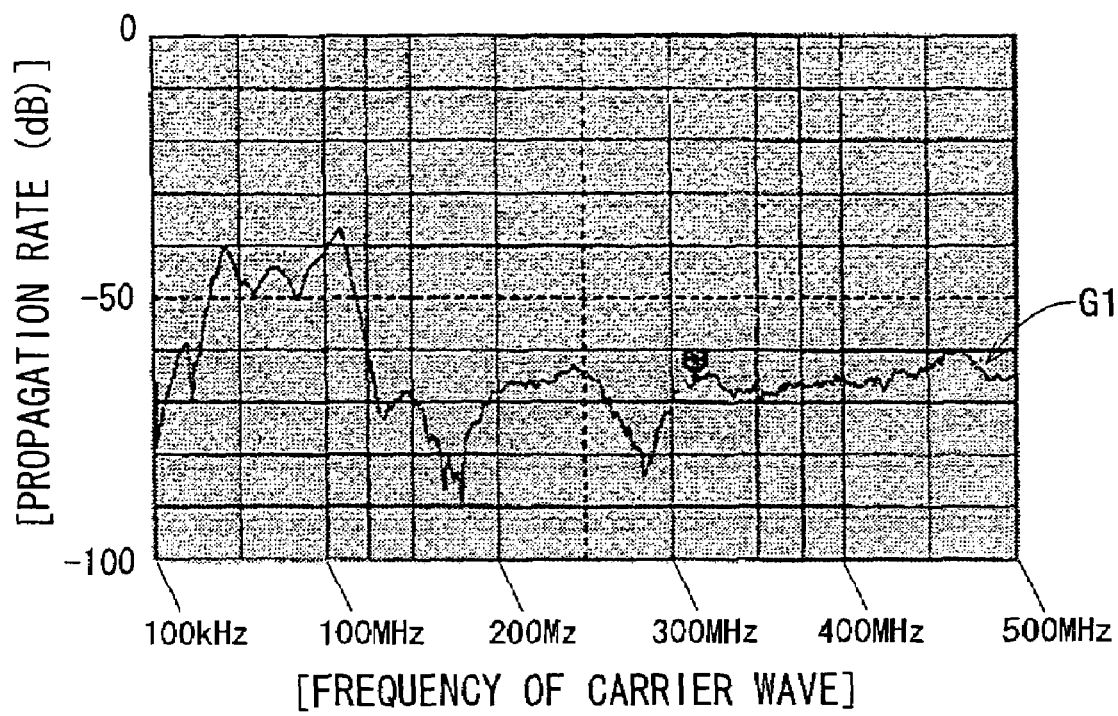
FIG. 12 is a graph showing the result of experiment 1.
Figure 12B:
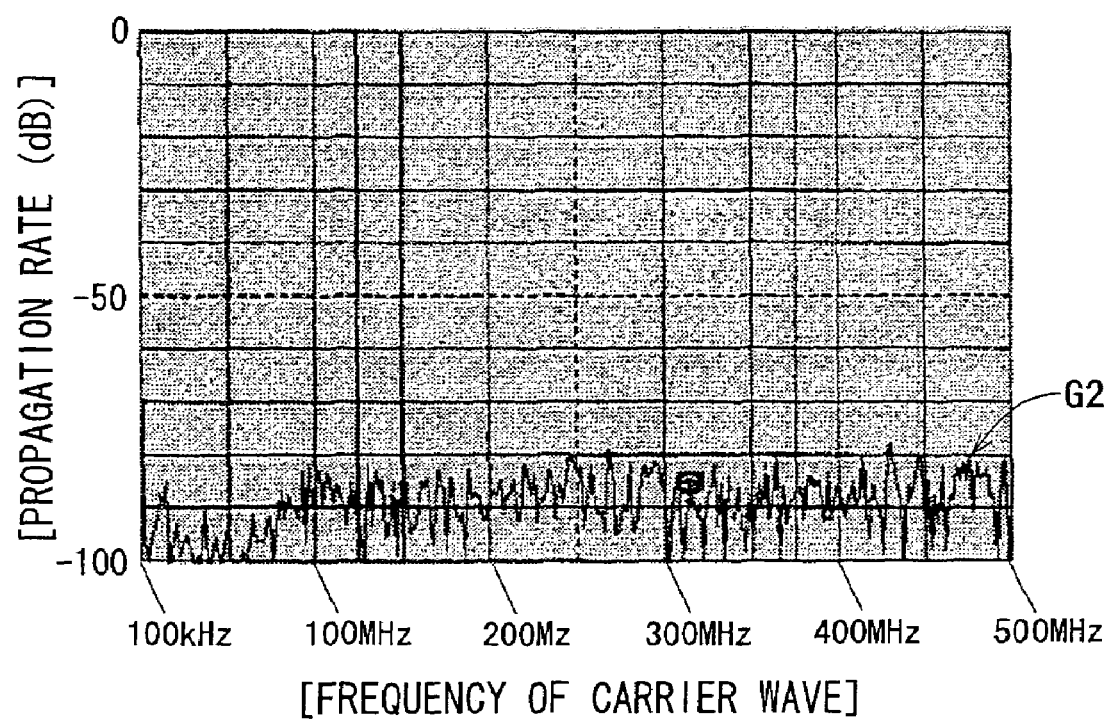

Result of Experiment 1:

Graph G1 in FIG. 12A shows the experimental results of example 1, whereas graph G2 of FIG. 12B shows an experimental result of conventional product 1. As obvious from graph G2, the propagation rate R of conventional product 1 was not more than −80 dB on an average, or more specifically, the rate of power received at the receiving side with respect to power P1 delivered from the transmission side was 1/108 in the range of overall measured frequency. However, example 1 had a higher propagation rate in the overall frequency range than conventional product 1. In particular, propagation rate R was not less than −50 dB in a frequency range from 40 to 100 MHz or not less than 1/105. Thus, the experiment proves that the propagation rate is higher in example 1 than in conventional product 1 and further that communication can be realized with smaller power consumption.

Figure 14:
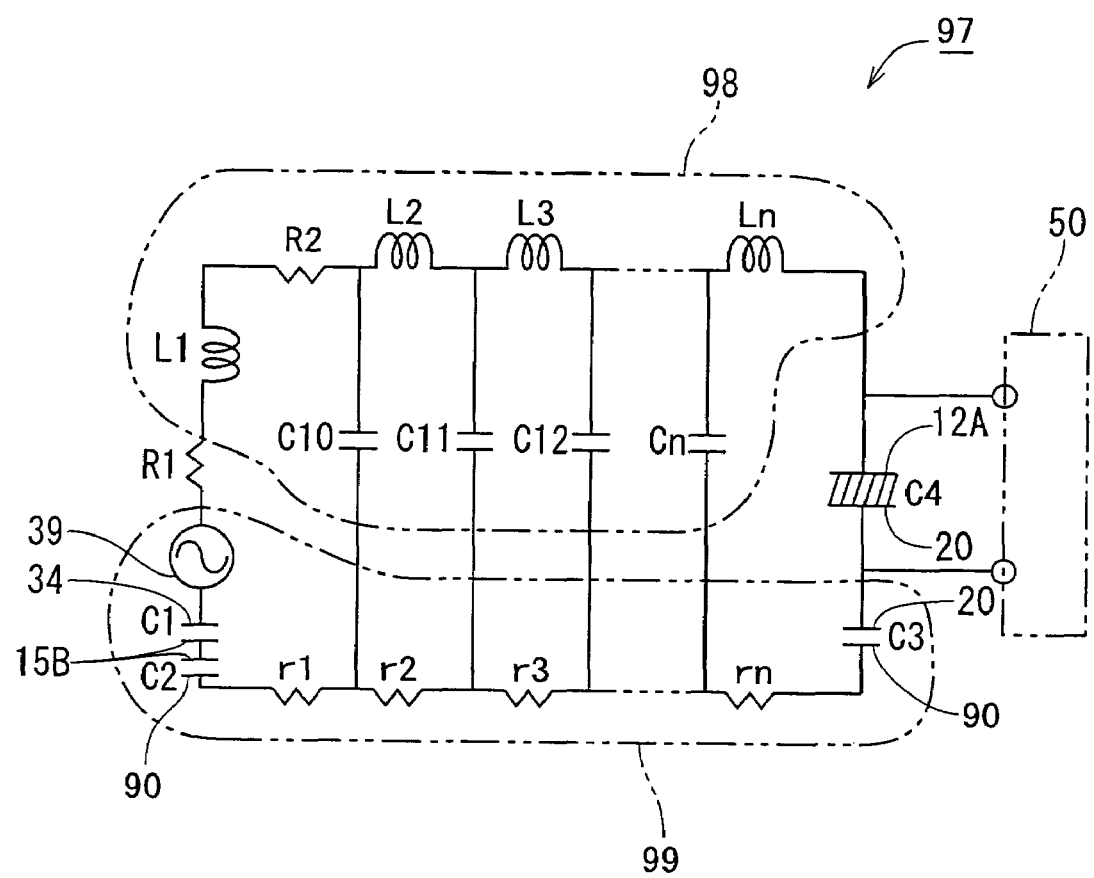
FIG. 14 is a circuit diagram showing a circuit equivalent to the tire information communication system.

The receiver sensitivity was higher in the frequency range of carrier wave from 40 to 100 MHz as described above. This is supposed to result from impedance matching by the interface 39Z explained in the first embodiment and furthermore from the point that an AC circuit 97 shown in FIG. 14 is composed in the vehicle 11 provided with example 1 which has the same arrangement as the foregoing first embodiment. Following TABLE 1 describes components of the AC circuit 97:

TABLE 1

| | |
|---|---|
| L1 | inductance of axle |
| R1 | resistance of tire wheel and axle |
| R2 | resistance of vehicle body |
| C1 | capacity between relay discharge sheet and metal net ($\epsilon_r = 10.0$) |
| C2 | capacity between metal net and ground ($\epsilon_r = 10.0$) |
| C3 | capacity between plate of patch antenna and ground ($\epsilon_r = 1.0$) |
| C4 | capacity between plate of patch antenna and chassis ($\epsilon_r = 2.2$) |
| C10 to Cn | capacity between vehicle body and ground |
| L2 to Ln | inductance of each part of vehicle body |
| r1 to rn | resistance of ground |

The AC circuit 97 includes a low-pass filter 98 and high-pass filter 99 as encircled by two-dot chain line in FIG. 14. Thus, it is supposed that the AC circuit 97 including the low-pass filter 98 and high-pass filter 99 serves as a band pass filter such that propagation rate R in the frequency band ranging from 40 to 100 MHz is relatively improved.

Method of Experiment 2:

The tire-pressure detector 30 of example 1 was mounted on the left front wheel 13 of the vehicle 11. The patch antennas 22 were provided beneath the left and right rear seats of the underside of the chassis 12A respectively. Signals were received through each patch antenna 22 by the tire monitor 50. The changes in propagation rate R relative to frequency were graphed in the same manner as described above.

Figure 13A:
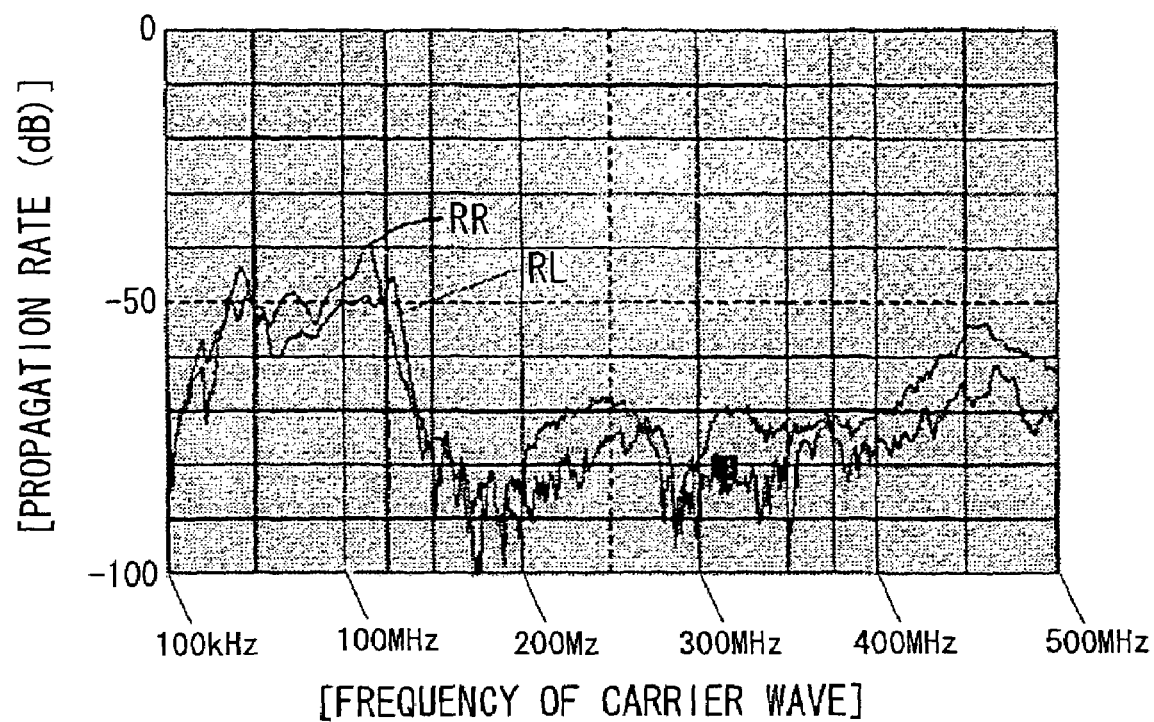
FIG. 13 is a graph showing the results of experiments 2 and 3.
Figure 13B:
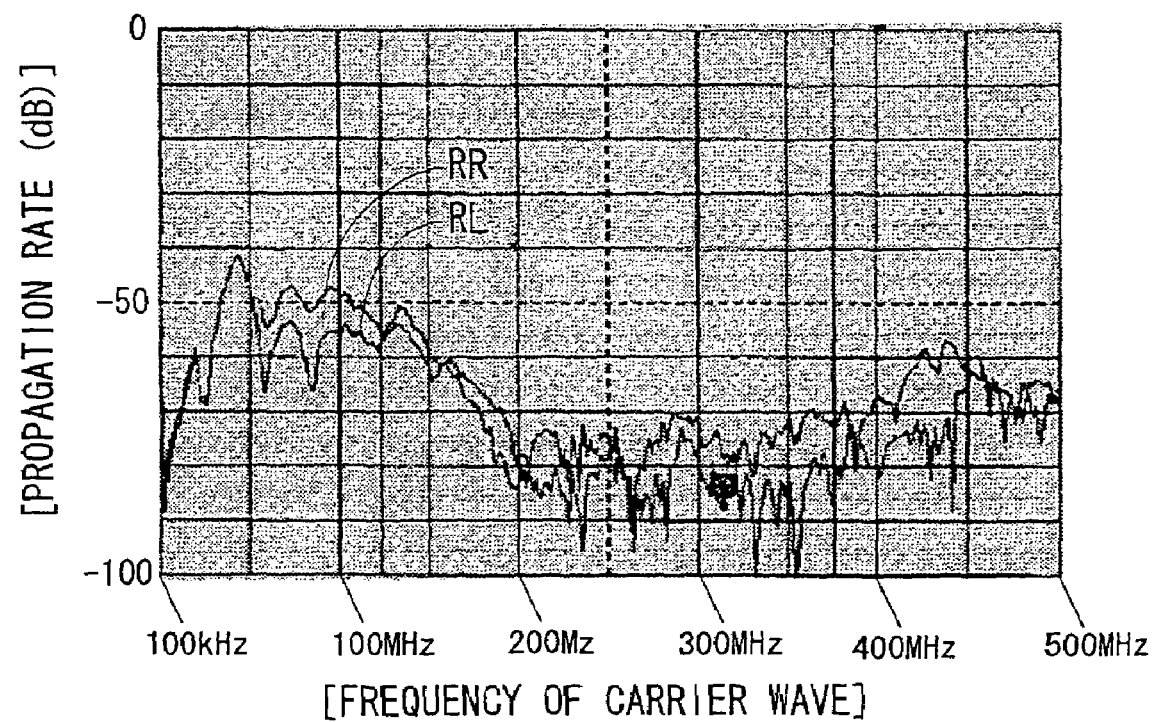

Result of Experiment 2:

Graph RL of FIG. 13A shows an experimental result of the case where the patch antenna was disposed beneath the left rear seat, whereas graph RR of FIG. 13B shows an experimental result of the case where the patch antenna was disposed beneath the right rear seat. As obvious from comparison between the graphs RL and RR, a large difference in the propagation rate R does not result from the difference in positions of patch antennas 22.

Method of Experiment 3:

The tire-pressure detector 30 of example 1 was mounted on the wheel 13. The wheel 13 was then rotated so that the changes in propagation rate R relative to the frequency were graphed in the same procedure as in the experiment 2.

Result of Experiment 3:

Experimental results are shown as graphs RL and RR in FIG. 13B. As obvious from comparison between FIGS. 13A and 13B, a large difference in the propagation rate R is not seen regardless of the rotation of the wheel 13. Furthermore, the wheel 13 was rotated at low speeds so that existence or absence of a null point was examined. However, no null point was found.

Method of Experiment 4:

The tire monitor 50 of example 1 was connected to the rear-glass antenna 95 and the chassis 12A as shown in FIG. 15A. AC voltage produced between the rear-glass antenna 95 and the chassis 12A was supplied to the tire monitor 50. Changes in the propagation rate R relative to the frequency were graphed in the same procedure as in the experiment 1. Furthermore, the tire monitor 50 was connected to the rod antenna 94 instead of the rear-glass antenna 95, and a graph was made in the same manner as described above. Still furthermore, the tire monitor 50 was connected to the trunk door 84 (more specifically, location designated by symbol C7 in FIG. 15A) instead of the rod antenna 94, and a graph was also made in the same manner as described above.

Figure 16A:
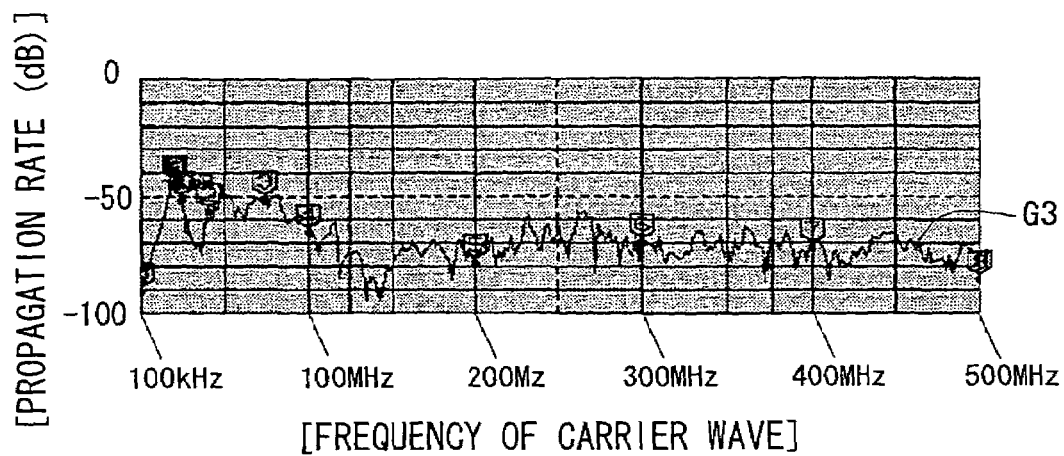
FIG. 16 is a graph showing the result of experiment 4.
Figure 16B:
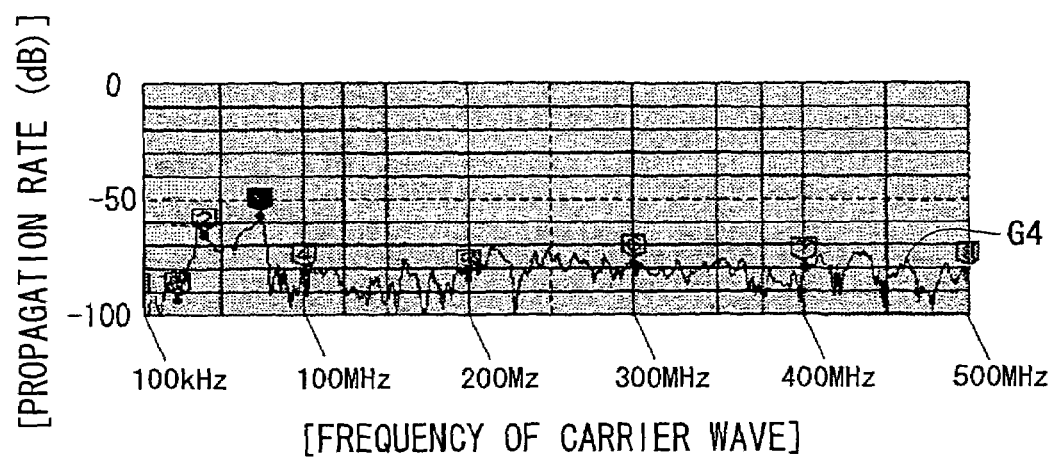
Figure 16C:
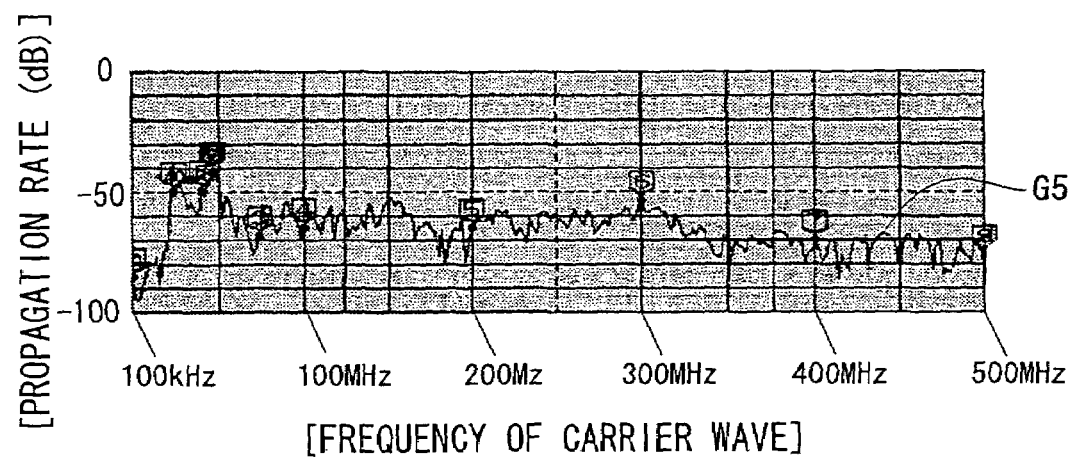

Result of Experiment 4:

Graph G3 in FIG. 16A shows an experimental result of the case where the rear-glass antenna 95 was used. Graph G4 in FIG. 16B shows an experimental result of the case where the rod antenna 94 was used. Furthermore, graph G5 in FIG. 16C shows an experimental result of the case where the trunk door 84 was used. When each of graphs G3 to G5 was compared with graph G1 in FIG. 12A, propagation rate R was lower in the case where the rear-glass antenna 95 or the like was used than in the case where the patch antenna 22 was used. However, propagation rate R was sufficiently higher in the case where the rear-glass antenna 95 or the like was used than in the conventional product 1 shown by graph G2 in FIG. 12B.

The invention should not be limited to the above-described embodiments and, for example, the following embodiments may be within the technical scope of the present invention. The invention may further be modified without departing from the scope thereof.

Figure 17:
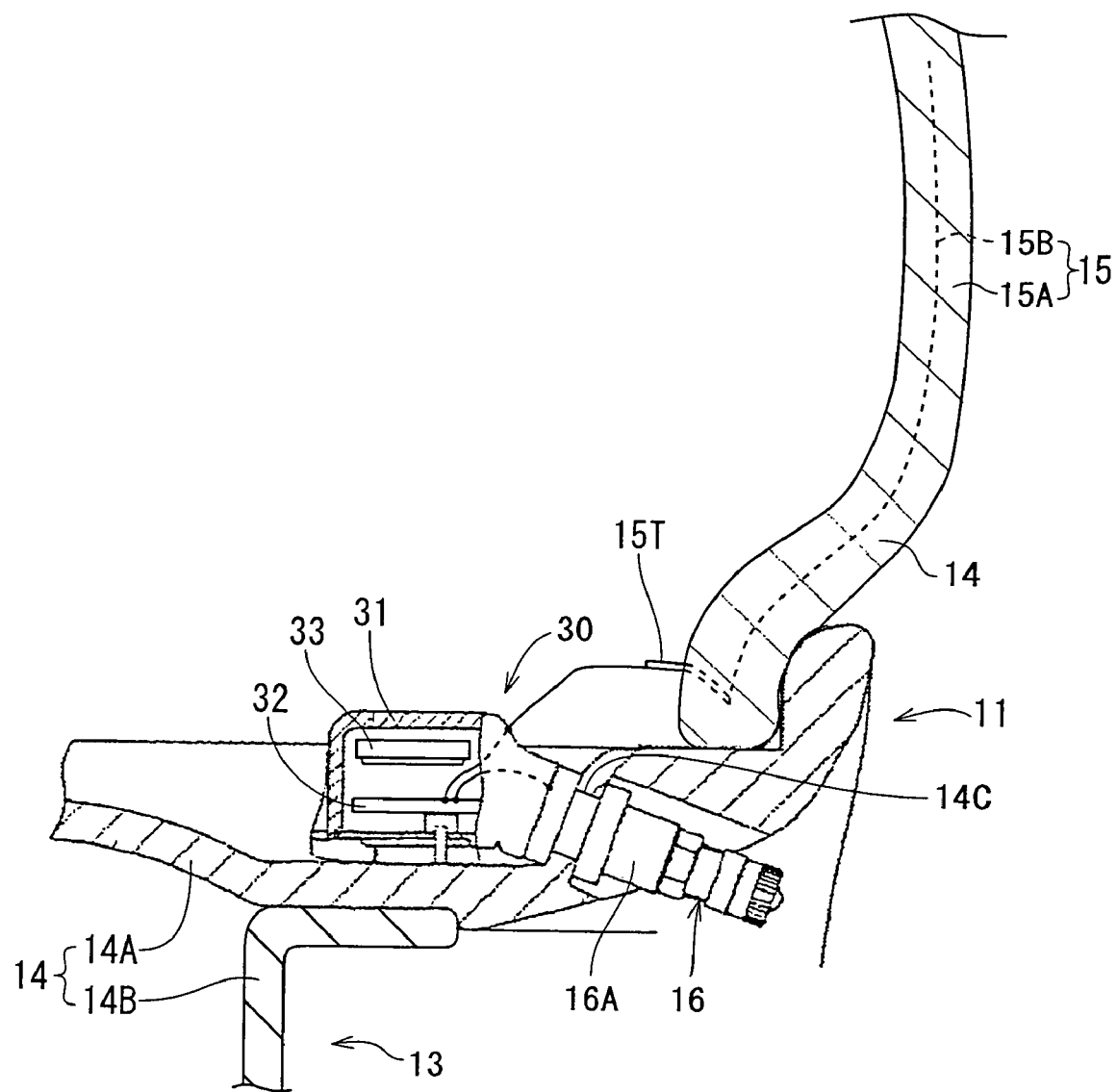
FIG. 17 is a sectional view of a tire, tire wheel and tire-pressure detector in modified form 1.

(1) Instead of the relay discharge sheet 34 in the first embodiment, a metal net terminal 15T conducted to the metal net 15B may be provided in the tire 15 so as to be exposed, and the output terminal 39A of the tire-side transmission circuit 39 may conductively be connected to the metal net terminal 15T, as shown in FIG. 17.

Figure 18:
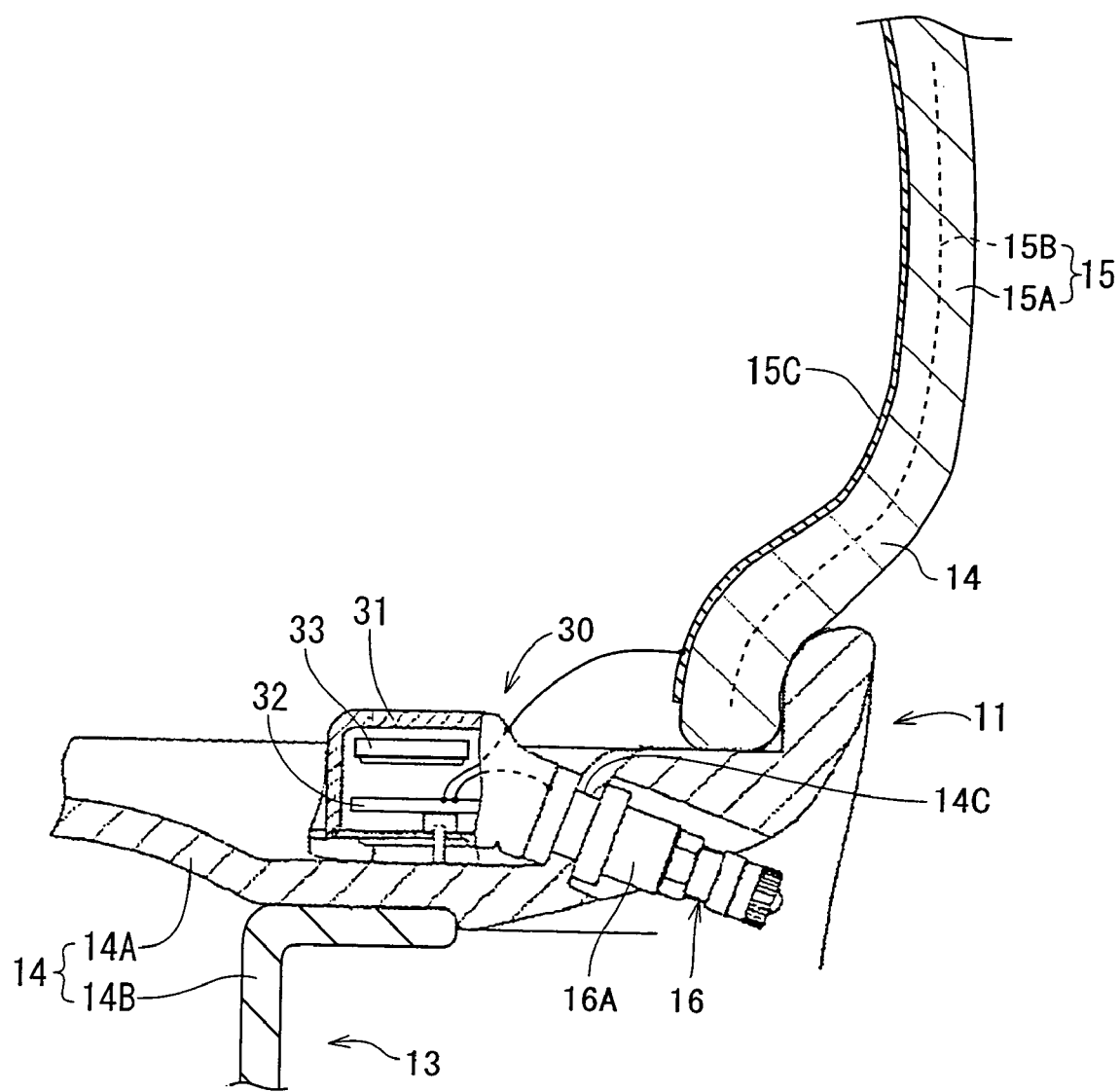
FIG. 18 is a sectional view of a tire, tire wheel and tire-pressure detector in modified form 2.

(2) Furthermore, a carbon film 15C may be formed by applying an electrically conductive carbon over the whole inner periphery of the tire 15, and the output terminal 39A of the tire-side transmission circuit 39 may conductively be connected to the carbon film 15C, as shown in FIG. 18. In this case, the metal net 15B may or may not be embedded in the tire 15.

Figure 19:
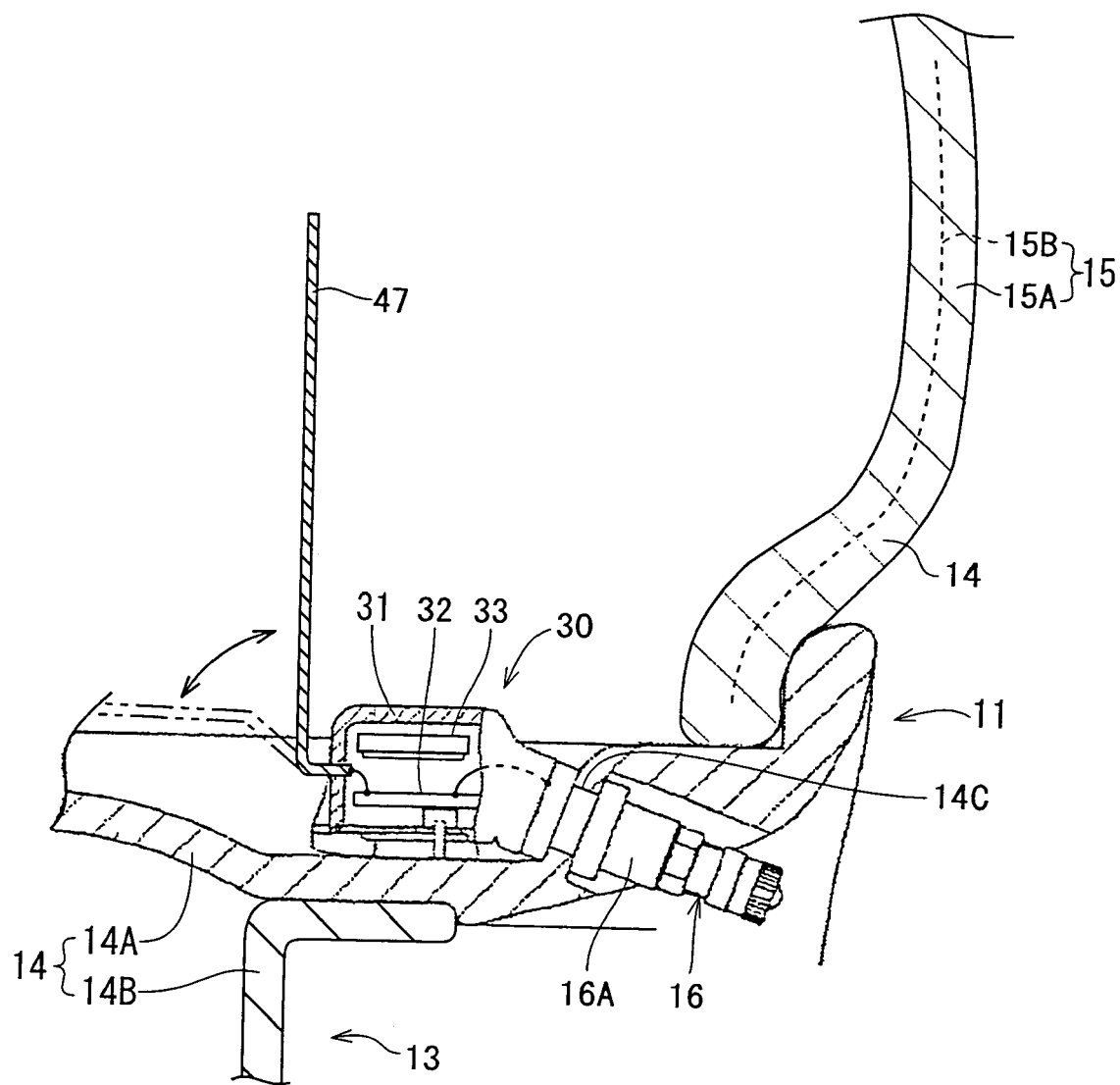
FIG. 19 is a sectional view of a tire, tire wheel and tire-pressure detector in modified form 3.

(3) A flexible antenna 47 having one end fixed on tire-pressure detector 30 may be provided as a relay discharge member in the invention as shown in FIG. 19. In this construction, the centrifugal force due to rotation of the wheel 13 parts the flexible antenna 47 from the rim 14A, whereupon an electric field can be produced between the metal net 15B and the flexible antenna 47. Furthermore, the tire 15 can easily be mounted on and removed from the tire wheel 14 while the flexible antenna 47 is laid on the rim 14A side. A flexible antenna 47 may be made by integrating a monopole antenna or a dipole antenna with a flexible substrate, for example.

(4) The frequency modulation is carried out for the carrier wave according to the information such as tire pressure in the first embodiment. However, a manner of modulation should not be limited to the frequency modulation but may be an amplitude modulation or a pulse modulation.

The foregoing description and drawings are merely illustrative of the principles of the present invention and are not to be construed in a limiting sense. Various changes and modifications will become clear to those of ordinary skill in the art. All such changes and modifications are seen to fall within the scope of the invention as defined by the appended claims.

What is claimed is:

1. A tire information communication system provided in a vehicle on which a tire wheel with a tire having an annular conductor provided over a whole periphery thereof is mounted and which the tire wheel is electrically conductive via an axle to a vehicle ground serving as an electrical ground of a vehicle body, the system transmitting and receiving information about inner pressure of the tire, the system comprising:

a tire-pressure detector mounted on the tire wheel for detecting a pressure of the tire, thereby transmitting a result of detection;

a tire monitor mounted on the vehicle body for obtaining information about tire pressure from the tire-pressure detector;

a tire-side transmission circuit provided in the tire-pressure detector for applying AC voltage containing information about tire pressure between the tire wheel and the annular conductor so that a radio wave is radiated from the annular conductor;

a vehicle ground isolation provided in the tire monitor so as to receive the radio wave from the annular conductor thereby to be capable of generating AC voltage between the vehicle ground and the vehicle ground isolation; and a body-side receiving circuit provided in the tire monitor for obtaining the information about the tire pressure from the AC voltage generated between the vehicle ground and the vehicle ground isolation.

2. The system according to claim 1, wherein the annular conductor is comprised of a metal net embedded in the tire.

3. The system according to claim 2, further comprising a metal net terminal provided so as to be conductive to the metal net and exposed inside the tire, the tire-side transmission circuit being conductively connected to the metal net terminal.

4. The system according to claim 2, further comprising a relay discharging member provided inside the tire so as to be conductively connected to the tire-side transmission circuit, the relay discharging member being capable of energizing the metal net in a non-contact manner.

5. The system according to claim 2, wherein the vehicle includes a chassis having an underside serving as the vehicle ground and the ground isolation is comprised of a plate placed opposite of the underside of the chassis.

6. The system according to claim 2, wherein the vehicle is an automobile which is provided with a car radio system or car navigation system and includes a rod antenna or rear-glass antenna for receiving electric waves for the car radio system or the car navigation system, and the vehicle ground isolation is comprised of the rod antenna or rear-glass antenna.

7. The system according to claim 2, wherein the vehicle includes a chassis serving as the vehicle ground and the vehicle ground isolation is comprised of a door defining a space together with the chassis therebetween.

8. The system according to claim 2, further comprising:
a body-side transmission circuit provided in the tire monitor for applying AC voltage containing information to be supplied to the tire-pressure detector between the vehicle ground and the vehicle ground isolation so that a radio wave is radiated from the vehicle ground isolation; and
a tire-side receiving circuit provided in the tire-pressure detector for obtaining the information from the tire monitor, based on AC voltage generated between the tire wheel and the annular conductor according to the electric wave from the vehicle ground isolation.

9. The system according to claim 2, further comprising:
a plurality of communication terminals provided on the vehicle body;
a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and
a plurality of terminal receiving circuits each obtaining the information from the other communication terminals, based on AC voltage generated between said one vehicle ground isolation and the vehicle ground according to the electric wave radiated from the other vehicle ground isolations.

10. The system according to claim 1, wherein the annular conductor is comprised of a carbon film formed by applying conductive carbon over a whole inner periphery of the tire.

11. The system according to claim 10, wherein the vehicle includes a chassis having an underside serving as the vehicle ground and the ground isolation is comprised of a plate placed opposite of the underside of the chassis.

12. The system according to claim 10, wherein the vehicle is an automobile which is provided with a car radio system or car navigation system and includes a rod antenna or rear-glass antenna for receiving electric waves for the car radio system or the car navigation system, and the vehicle ground isolation is comprised of the rod antenna or rear-glass antenna.

13. The system according to claim 10, wherein the vehicle includes a chassis serving as the vehicle ground and the vehicle ground isolation is comprised of a door defining a space together with the chassis therebetween.

14. The system according to claim 10, further comprising:
a body-side transmission circuit provided in the tire monitor for applying AC voltage containing information to be supplied to the tire-pressure detector between the vehicle ground and the vehicle ground isolation so that a radio wave is radiated from the vehicle ground isolation; and
a tire-side receiving circuit provided in the tire-pressure detector for obtaining the information from the tire monitor, based on AC voltage generated between the tire wheel and the annular conductor according to the electric wave from the vehicle ground isolation.

15. The system according to claim 10, further comprising:
a plurality of communication terminals provided on the vehicle body;
a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and
a plurality of terminal receiving circuits each obtaining the information from the other communication terminals, based on AC voltage generated between said one vehicle ground isolation and the vehicle ground according to the electric wave radiated from the other vehicle ground isolations.

16. The system according to claim 1, wherein the vehicle includes a chassis having an underside serving as the vehicle ground and the ground isolation is comprised of a plate placed opposite of the underside of the chassis.

17. The system according to claim 16, further comprising:
a body-side transmission circuit provided in the tire monitor for applying AC voltage containing information to be supplied to the tire-pressure detector between the vehicle ground and the vehicle ground isolation so that a radio wave is radiated from the vehicle ground isolation; and
a tire-side receiving circuit provided in the tire-pressure detector for obtaining the information from the tire monitor, based on AC voltage generated between the tire wheel and the annular conductor according to the electric wave from the vehicle ground isolation.

18. The system according to claim 16, further comprising:
a plurality of communication terminals provided on the vehicle body;
a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and
a plurality of terminal receiving circuits each obtaining the information from the other communication terminals, based on AC voltage generated between said one vehicle ground isolation and the vehicle ground according to the electric wave radiated from the other vehicle ground isolations.

19. The system according to claim 1, wherein the vehicle is an automobile which is provided with a car radio system or car navigation system and includes a rod antenna or rear-glass antenna for receiving electric waves for the car radio system or the car navigation system, and the vehicle ground isolation is comprised of the rod antenna or rear-glass antenna.

20. The system according to claim 19, further comprising:
a body-side transmission circuit provided in the tire monitor for applying AC voltage containing information to be supplied to the tire-pressure detector between the vehicle ground and the vehicle ground isolation so that a radio wave is radiated from the vehicle ground isolation; and
a tire-side receiving circuit provided in the tire-pressure detector for obtaining the information from the tire monitor, based on AC voltage generated between the tire wheel and the annular conductor according to the electric wave from the vehicle ground isolation.

21. The system according to claim 19, further comprising:
a plurality of communication terminals provided on the vehicle body;
a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and a plurality of terminal receiving circuits each obtaining the information from the other communication terminals, based on AC voltage generated between said one vehicle ground isolation and the vehicle ground according to the electric wave radiated from the other vehicle ground isolations.

22. The system according to claim 1, wherein the vehicle includes a chassis serving as the vehicle ground and the vehicle ground isolation is comprised of a door defining a space together with the chassis therebetween.

23. The system according to claim 22, further comprising:

a body-side transmission circuit provided in the tire monitor for applying AC voltage containing information to be supplied to the tire-pressure detector between the vehicle ground and the vehicle ground isolation so that a radio wave is radiated from the vehicle ground isolation; and a tire-side receiving circuit provided in the tire-pressure detector for obtaining the information from the tire monitor, based on AC voltage generated between the tire wheel and the annular conductor according to the electric wave from the vehicle ground isolation.

24. The system according to claim 22, further comprising:

a plurality of communication terminals provided on the vehicle body;

a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and a plurality of terminal receiving circuits each obtaining the information from the other communication terminals, based on AC voltage generated between said one vehicle ground isolation and the vehicle ground according to the electric wave radiated from the other vehicle ground isolations.

25. The system according to claim 1, further comprising:

a body-side transmission circuit provided in the tire monitor for applying AC voltage containing information to be supplied to the tire-pressure detector between the vehicle ground and the vehicle ground isolation so that a radio wave is radiated from the vehicle ground isolation; and a tire-side receiving circuit provided in the tire-pressure detector for obtaining the information from the tire monitor, based on AC voltage generated between the tire wheel and the annular conductor according to the electric wave from the vehicle ground isolation.

26. The system according to claim 25, further comprising:

a plurality of communication terminals provided on the vehicle body;

a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and a plurality of terminal receiving circuits each obtaining the information from the other communication terminals, based on AC voltage generated between said one vehicle ground isolation and the vehicle ground according to the electric wave radiated from the other vehicle ground isolations.

27. The system according to claim 1, further comprising:

a plurality of communication terminals provided on the vehicle body;

a plurality of terminal transmission circuits provided on each communication terminal for applying AC voltage containing information to be supplied to the other communication terminals between one of the vehicle ground isolations and the vehicle ground so that a radio wave is radiated from said one vehicle ground isolation, respectively; and a plurality of terminal receiving circuits each obtaining the information from the other communication terminals, based on AC voltage generated between said one vehicle ground isolation and the vehicle ground according to the electric wave radiated from the other vehicle ground isolations.

* * * * *

UNITED STATES PATENT AND TRADEMARK OFFICE
CERTIFICATE OF CORRECTION

PATENT NO. : 7,251,993 B1  Page 1 of 1
APPLICATION NO. : 11/448067
DATED : August 7, 2007
INVENTOR(S) : Youichi Okubo et al.

It is certified that error appears in the above-identified patent and that said Letters Patent is hereby corrected as shown below:

Title Page, Insert:
-- (65)        Prior Publication Data
    US-2007-0144248-A1     June 28, 2007--

Signed and Sealed this

Twenty-seventh Day of November, 2007

JON W. DUDAS
*Director of the United States Patent and Trademark Office*